United States Patent
Silvis et al.

(10) Patent No.: US 8,450,430 B2
(45) Date of Patent: May 28, 2013

(54) FUNCTIONALIZED OLEFIN POLYMERS, COMPOSITIONS AND ARTICLES PREPARED THEREFROM, AND METHOD OF MAKING THE SAME

(75) Inventors: H. Craig Silvis, Midland, MI (US); Stephen F. Hahn, Lake Jackson, TX (US); David F. Pawlowski, Midland, MI (US); Patricia Ansems, Lake Jackson, TX (US); Laura K. Mergenhagen, Lake Jackson, TX (US); Hamed Lakrout, Midland, MI (US)

(73) Assignee: Dow Global Technologies, LLC, Midland, MI (US)

( * ) Notice: Subject to any disclaimer, the term of this patent is extended or adjusted under 35 U.S.C. 154(b) by 834 days.

(21) Appl. No.: 12/519,504

(22) PCT Filed: Dec. 21, 2007

(86) PCT No.: PCT/US2007/088599
§ 371 (c)(1),
(2), (4) Date: Jun. 16, 2009

(87) PCT Pub. No.: WO2008/080081
PCT Pub. Date: Jul. 3, 2008

(65) Prior Publication Data
US 2010/0093942 A1    Apr. 15, 2010

Related U.S. Application Data

(60) Provisional application No. 60/876,287, filed on Dec. 21, 2006, provisional application No. 60/952,271, filed on Jul. 27, 2007, provisional application No. 60/952,272, filed on Jul. 27, 2007, provisional application No. 60/952,425, filed on Jul. 27, 2007, provisional application No. 60/955,464, filed on Aug. 13, 2007.

(51) Int. Cl.
*C08F 10/04* (2006.01)
*C08L 23/36* (2006.01)

(52) U.S. Cl.
USPC .................................. 525/333.7; 525/240

(58) Field of Classification Search
USPC .............................................. 525/333.7, 240
See application file for complete search history.

(56) References Cited

U.S. PATENT DOCUMENTS

| | | |
|---|---|---|
| 3,231,619 A | 1/1966 | Speranza |
| 3,471,460 A | 10/1969 | Rees |
| 3,645,992 A | 2/1972 | Elston |
| 3,862,265 A | 1/1975 | Steinkamp et al. |
| 4,076,698 A | 2/1978 | Anderson et al. |
| 4,137,185 A | 1/1979 | Gardiner et al. |
| 4,374,956 A | 2/1983 | Coran et al. |
| 4,612,335 A | 9/1986 | Cuscurida et al. |
| 4,701,432 A | 10/1987 | Welborn, Jr. |
| 4,762,890 A | 8/1988 | Strait et al. |
| 4,798,081 A | 1/1989 | Hazlitt et al. |
| 4,888,446 A | 12/1989 | Klein et al. |
| 4,927,888 A | 5/1990 | Strait et al. |
| 4,935,397 A | 6/1990 | Chang |
| 4,937,301 A | 6/1990 | Chang |
| 4,950,541 A | 8/1990 | Tabor et al. |
| 5,055,438 A | 10/1991 | Canich |
| 5,272,236 A | 12/1993 | Lai et al. |
| 5,278,272 A | 1/1994 | Lai et al. |
| 5,414,027 A | 5/1995 | DeNicola, Jr. et al. |
| 5,424,367 A | 6/1995 | Auda et al. |
| 5,464,907 A | 11/1995 | Jelenic et al. |
| 5,552,096 A * | 9/1996 | Auda et al. ................ 264/85 |
| 5,599,881 A | 2/1997 | Xie |
| 5,651,927 A | 7/1997 | Auda et al. |
| 5,744,429 A | 4/1998 | Chung et al. |
| 5,886,194 A | 3/1999 | Ulmer et al. |
| 5,919,983 A | 7/1999 | Rosen et al. |
| 6,030,917 A | 2/2000 | Weinberg et al. |
| 6,054,544 A | 4/2000 | Finlayson et al. |
| 6,248,540 B1 | 6/2001 | Weinberg et al. |
| 6,268,444 B1 | 7/2001 | Klosin et al. |
| 6,306,658 B1 | 10/2001 | Turner et al. |
| 6,316,663 B1 | 11/2001 | Guram et al. |
| 6,335,410 B1 | 1/2002 | Finlayson et al. |
| 6,362,309 B1 | 3/2002 | Lund et al. |
| 6,395,671 B2 | 5/2002 | LaPointe |
| 6,469,099 B1 | 10/2002 | Farah et al. |

(Continued)

FOREIGN PATENT DOCUMENTS

| | | |
|---|---|---|
| EP | 0 036 949 A1 | 10/1981 |
| EP | 0 129 368 A1 | 12/1984 |

(Continued)

OTHER PUBLICATIONS

Lu et al., "Melt Amination of Polypropylenes", 43 J. of Polym. Sci.-Polym. Chem. (2005), pp. 4217-4232.
Lu et al., "Reactivity of Common Functional Groups with Urethanes", 40 J. Polym. Sci.-Polym. Chem. (2002), pp. 2310-2328.
Ciolino et al., "Melt Grafting of Maleamic Acid onto LLDPE", 40 J. Polym. Sci.-Polym. Chem. (2002), pp. 3950-3958.
Markovich et al., "Development of gel-permeation chromatography-Fourier transform infrared spectroscopy . . . ". 65 Polymeric Mater. Sci. and Eng. (1991), pp. 98-100.
Deslauriers et al., "Quantifying short chain branching microstructures in ethylene-1-olefin copolymers using size exclusion chromatography . . . ", 43 Polymer (2002), pp. 159-170.
Randall, "A Review of High Resolution Liquid 13Carbon . . . ", JMS-Rev. Micromole. Chem. Phys., C29 (2&3) (1989), pp. 285-297.
Zimm et al., "The Dimensions of Chain Molecules Containing Branches and Rings", 17 J. Chem. Phys. (1949), pp. 1301-1314.

(Continued)

*Primary Examiner* — Ling Choi
*Assistant Examiner* — Chun-Cheng Wang

(57) ABSTRACT

In one aspect the invention provides a melt process for preparing a functionalized olefin multiblock interpolymer, said process comprising grafting onto the backbone of the olefin multiblock interpolymer at least one compound comprising at least one "amine-reactive" group to form a grafted olefin multiblock interpolymer, and reacting a primary-secondary diamine or an alkanolamine with the grafted olefin multiblock interpolymer, without the isolation of the grafted olefin multiblock interpolymer.

13 Claims, 14 Drawing Sheets

U.S. PATENT DOCUMENTS

| | | |
|---|---|---|
| 6,723,810 B2 | 4/2004 | Kolthammer et al. |
| 6,919,407 B2 | 7/2005 | Tau et al. |
| 6,953,764 B2 | 10/2005 | Frazier et al. |
| 2003/0004286 A1 | 1/2003 | Klosin et al. |
| 2003/0204017 A1 | 10/2003 | Stevens et al. |
| 2004/0010103 A1 | 1/2004 | Boussie et al. |
| 2006/0025316 A1 | 2/2006 | Covitch et al. |
| 2006/0199907 A1 | 9/2006 | Chang et al. |
| 2006/0199914 A1 | 9/2006 | Harris et al. |
| 2006/0199930 A1 | 9/2006 | Li Pi Shan et al. |
| 2010/0143651 A1 | 6/2010 | Silvis et al. |
| 2010/0292403 A1 | 11/2010 | Ansems et al. |

FOREIGN PATENT DOCUMENTS

| | | |
|---|---|---|
| EP | 0 190 889 A1 | 8/1986 |
| EP | 0 260 999 A1 | 3/1988 |
| EP | 0 634 424 A1 | 1/1993 |
| EP | 0 754 711 A1 | 1/1997 |
| EP | 0 634 424 B1 | 5/1997 |
| WO | WO 90/07526 | 7/1990 |
| WO | WO 93/02113 | 2/1993 |
| WO | WO 01/29095 | 4/2001 |
| WO | WO 03/040195 | 5/2003 |
| WO | WO 2004/024740 A1 | 3/2004 |
| WO | WO 2005/090425 | 9/2005 |
| WO | WO 2005/090426 | 9/2005 |
| WO | WO 2005/090427 | 9/2005 |
| WO | WO 2006/039774 | 4/2006 |
| WO | WO-2006/102016 | 9/2006 |

OTHER PUBLICATIONS

Rudin, "Measurement of Long-Chain Branch Frequency...", Modern Methods of Polymer Characterization, John Wiley & Sons, New York (1991), pp. 103-112.

Galli et al. "High Yield Catalysts in olefin Polymerization", 120 Angew. Macromol. Chem. (1984), pp. 73-90.

E.P. Moore, et al. In Polypropylene Handbook, Hanser Publishers, New York, 1996, pp. 11-98.

Williams et al., "The Construction of a Polyethylene Calibration Curve for Gel Permeation...", 6 Polymer Lett. (1968), pp. 621-624.

Wilde et al., Determination of Branching Distributions in Polyethylene and Ethylene Copolymers, 20 J. Polym. Sci. (1982), pp. 441-455.

U.S. Appl. No. 60/662,937, filed Mar. 17, 2005.

U.S. Appl. No. 60/662,939, filed Mar. 17, 2005.

U.S. Appl. No. 60/662,938, filed Mar. 17, 2005.

U.S. Appl. No. 60/553,906, filed Mar. 17, 2004.

English translation of Second Chinese Office Action (undated) for Chinese Patent Application No. 200780051229.6.

Chinese Patent Application, Serial No. 200780051229.6, filed Dec. 21, 2007, Office Action dated Dec. 31, 2010, 10 pages.

* cited by examiner

FUNCTIONALIZED OLEFIN POLYMERS, COMPOSITIONS AND ARTICLES PREPARED THEREFROM, AND METHOD OF MAKING THE SAME

CROSS-REFERENCE TO RELATED APPLICATIONS

For purposes of United States patent practice, this application claims priority to and incorporates by reference in their entirety the contents of U.S. Provisional Application Nos. 60/876,287 filed on Dec. 21, 2006, 60/952,272 filed on Jul. 27, 2007, 60/952,425 filed on Jul. 27, 2007, 60/955,464 filed on Aug. 13, 2007 and 60/952,271 filed on Jul. 27, 2007.

FIELD OF INVENTION

The invention provides olefin multiblock interpolymers comprising amine functionality and/or hydroxyl functionality, and methods for making the same. The invention also provides articles comprising at least one component prepared from such compositions.

BACKGROUND OF THE INVENTION

Polyolefins, as a class of materials, have relatively poor adhesion and compatibility with more polar polymeric materials. In most cases, a separate adhesive is required in order to adhere polyolefins to polar substrates like polyesters, polyamides, polyurethanes, and the like. Similarly, a third component compatibilizer typically has to be used to prepare satisfactory melt blends of polyolefins with other more polar thermoplastics.

Typically, anhydride grafting onto polyolefins is used to provide some level of compatibility and/or adhesion to more polar substrates, however, this functionality is not optimum for adhesion in many cases. In particular, strong adhesion to polyurethane (PU) substrates is achieved if covalent bonds can be formed across the interface of a polyolefin-polyurethane structure. Adhesion to PU substrates can be improved using a polyolefin with functional groups that can react with urethane linkages and/or terminal isocyanate groups. Attempts have been made to incorporate amine functionality and/or hydroxyl functionality into a polyolefin, by reacting primary diamines or alkanolamines with anhydride grafted polyolefins. However, it has been difficult to prepare such functional polymers, since the unreacted amine groups and unreacted hydroxyl groups of the imide can further react with anhydride to form branched and crosslinked structures in the final polymer product. In addition, such reactions typically required the initial formation and isolation of an anhydride grafted polyolefin, prior to the reaction with the functionalization agent (diamine or alkanolamine). Thus the separate formation and isolation of the graft precursor adds additional processing costs to the functionalization reaction.

U.S. Pat. No. 5,424,367 and U.S. Pat. No. 5,552,096 and U.S. Pat. No. 5,651,927 disclose sequential reactions in one extruder for the functionalization of a polymer. Each reaction zone has means for introduction of reagents, for mixing of reagents with polymer and for removal of by/co-products or unreacted reagents. These patents do not disclose the use of primary-secondary diamines to reduce competing crosslinking reactions.

International Publication No. WO 93/02113 discloses (1) graft polymers comprising reactive amine functionality that are prepared by reacting a thermoplastic polymer, comprising at least one electrophilic functionality sufficient to react with primary amino groups, and (2) a compound comprising a primary amine and a secondary amine, the secondary amine having reactivity approximately equal to, or less than, the primary amine. However, this reference does not disclose a subsequent in-situ functionalization of a grafted polyolefin, without the prior isolation of the grafted polyolefin.

Additional functionalization reactions are disclosed in U.S. Pat. No. 6,469,099 B1; U.S. Pat. No. 5,599,881; U.S. Pat. No. 5,886,194; U.S. Pat. No. 4,137,185; U.S. Pat. No. 4,374,956; U.S. Pat. No. 3,471,460; U.S. Pat. No. 3,862,265; U.S. Publication No. US 20060025316; European Application No. 0 634 424 A1; European Application No. 0 036 949 A; International Publication No. WO 01/29095; International Publication No. WO 06/039774; and in the following references, "Melt Amination of Polypropylenes," Q. W. Lu et al., *Journal of Polym. Sci.-Polym. Chem.* 43, 4217 (2005); "Reactivity of Common Functional Groups with Urethanes," Q. W. Lu et al., *Journal of Polym. Sci.-Polym. Chem.*, 40, 2310 (2002); and "Melt Grafting of Mateamic Acid onto LLDPE," A. E. Ciolino et al., *Journal of Polym. Sci.-Polym, Chem.*, 40, 3950 (2002).

However, these references do not disclose amine functionalized and hydroxyl functionalized polyolefins that can be prepared in a low cost manner, without producing significant amounts of branching and crosslinks in the final polymer product. There is a need for an in-situ preparation of amine functionalized or hydroxyl functionalized polyolefin that does not require the initial formation and isolation of a graft polyolefin precursor, and that does not result in the formation of significant branching and crosslinking in the functionalized polyolefin. Moreover, there is a need for an amine-functionalized polyolefin that provides enhanced compatibility and/or adhesion to polyurethane substrates. These needs and others have been met by the following invention.

SUMMARY OF THE INVENTION

In one aspect, the invention provides a process for preparing a functionalized olefin multiblock interpolymer, said process comprising the following steps:
  grafting onto the backbone of an olefin multiblock interpolymer at least one compound comprising at least one "amine-reactive" group to form a grafted olefin multiblock interpolymer;
  reacting a primary-secondary diamine with the grafted olefin multiblock interpolymer; and
  wherein step B) takes place subsequent to step A), without the isolation of the grafted olefin multiblock interpolymer, and wherein both steps A) and B) take place in a melt reaction.

In another aspect, the invention provides a process for preparing a functionalized olefin multiblock interpolymer, said process comprising the following steps:
  grafting onto the backbone of an olefin multiblock interpolymer at least one compound comprising at least one "amine-reactive" group to form a grafted olefin multiblock interpolymer;
  reacting a alkanolamine with the grafted olefin multiblock interpolymer; and
  wherein step B) takes place subsequent to step A), without the isolation of the grafted olefin multiblock interpolymer, and wherein both steps A) and B) take place in a melt reaction.

In another aspect, the invention provides a process for preparing a functionalized olefin multiblock interpolymer, said process comprising the following steps:

A) grafting onto the backbone of an olefin multiblock interpolymer at least one compound comprising at least one "amine-reactive" group to form a grafted olefin multiblock interpolymer;

B) reacting a primary-secondary diamine or an alkanolamine with the grafted olefin multiblock interpolymer; and C) wherein step B) takes place subsequent to step A), without the isolation of the grafted olefin multiblock interpolymer, and wherein both steps A) and B) take place in a melt reaction. In a preferred embodiment, the primary-secondary diamine is selected from N-ethylethylenediamine, N-phenylethylenediamine, N-phenyl-1,2-phenylene-diamine, N-phenyl-1,4-phenylenediamine, or 4-(aminomethyl)piperidine. In a preferred embodiment, the alkanolamine is selected from 2-aminoethanol, 2-amino-1-propanol, 3-amino-1-propanol, 2-amino-1-butanol, 2-(2-aminoethoxy)-ethanol or 2-aminobenzyl alcohol.

In one embodiment, both steps A and B take place in a batch reactor.

In another embodiment, both steps A and B take place in a Brabender mixer, a Busch mixer or a Farrel mixer.

In another embodiment, step A takes place in an extruder, and step B takes place in a gear pump.

In another embodiment, step A takes place in an extruder, and step B takes place in a batch mixer. In a further embodiment, the batch mixer is of commercial dimensions. In another embodiment, the batch mixer is of lab scale or pilot plant dimensions.

In another embodiment, step A takes place in an extruder, and step B takes place in a separate extruder.

In another embodiment, there is no purification step between steps A and B.

In another embodiment, there is no venting of volatiles between steps A and B.

In another aspect, the invention provides a process for preparing an imide functionalized olefin multiblock interpolymer, said process comprising the following steps:

grafting onto the backbone of an olefin multiblock interpolymer, in a melt reaction, at least one compound of the following formula (IV) to form a grafted olefin multiblock interpolymer:

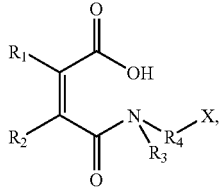

(IV)

and thermally treating the grafted olefin multiblock interpolymer to form the imide functionalized olefin multiblock interpolymer, and wherein R1 and R2 are, independently, either hydrogen or a C1-C20 hydrocarbyl radical, which is linear or branched; R3 is hydrogen or a C1-C20 hydrocarbyl radical, which is linear or branched; R4 is a hydrocarbyl di-radical, which is linear or branched; X is OH or $NHR_5$, where R5 is a hydrocarbyl radical, which is linear or branched, or a hydroxyethyl group.

In yet another aspect, the invention provides a process for preparing a imide functionalized olefin multiblock interpolymer, said process comprising the following steps:

A) functionalizing the olefin multiblock interpolymer with at least one compound comprising at least one "amine-reactive" group to form a grafted olefin multiblock interpolymer;

B) blending the grafted olefin multiblock interpolymer, in a solid, non-molten form, with at least one primary-secondary diamine;

C) imbibing the primary-secondary diamine into the grafted olefin multiblock interpolymer;

D) reacting the primary-secondary diamine with the grafted olefin multiblock interpolymer to form an imide functionalized olefin multiblock interpolymer.

The olefin multiblock interpolymer employed in the aforementioned processes often comprises an ethylene/α-olefin multiblock interpolymer, wherein, the ethylene/α-olefin multiblock interpolymer has one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2; \text{ or}$$

(4) an Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G' (25° C.), and a storage modulus at 100° C., G' (100° C.), wherein the ratio of G' (25° C.) to G' (100° C.) is in the range of about 1:1 to about 9:1.

The olefin multiblock interpolymer characteristics (1) through (7) above are given with respect to the interpolymer before any significant crosslinking or functionalization, i.e., before crosslinking or functionalization. The multiblock interpolymers useful in the present invention may or may not be initially crosslinked or functionalized depending upon the desired properties. By using characteristics (1) through (7) as measured before crosslinking or functionalizing is not meant to suggest that the interpolymer is required or not required to be crosslinked or functionalized—only that the characteristic is measured with respect to the interpolymer without significant crosslinking or functionalization. Crosslinking and/or functionalization may or may not change each of these properties depending upon the specific polymer and degree of crosslinking or functionalization.

DETAILED DESCRIPTION OF THE INVENTION

Figure 1:
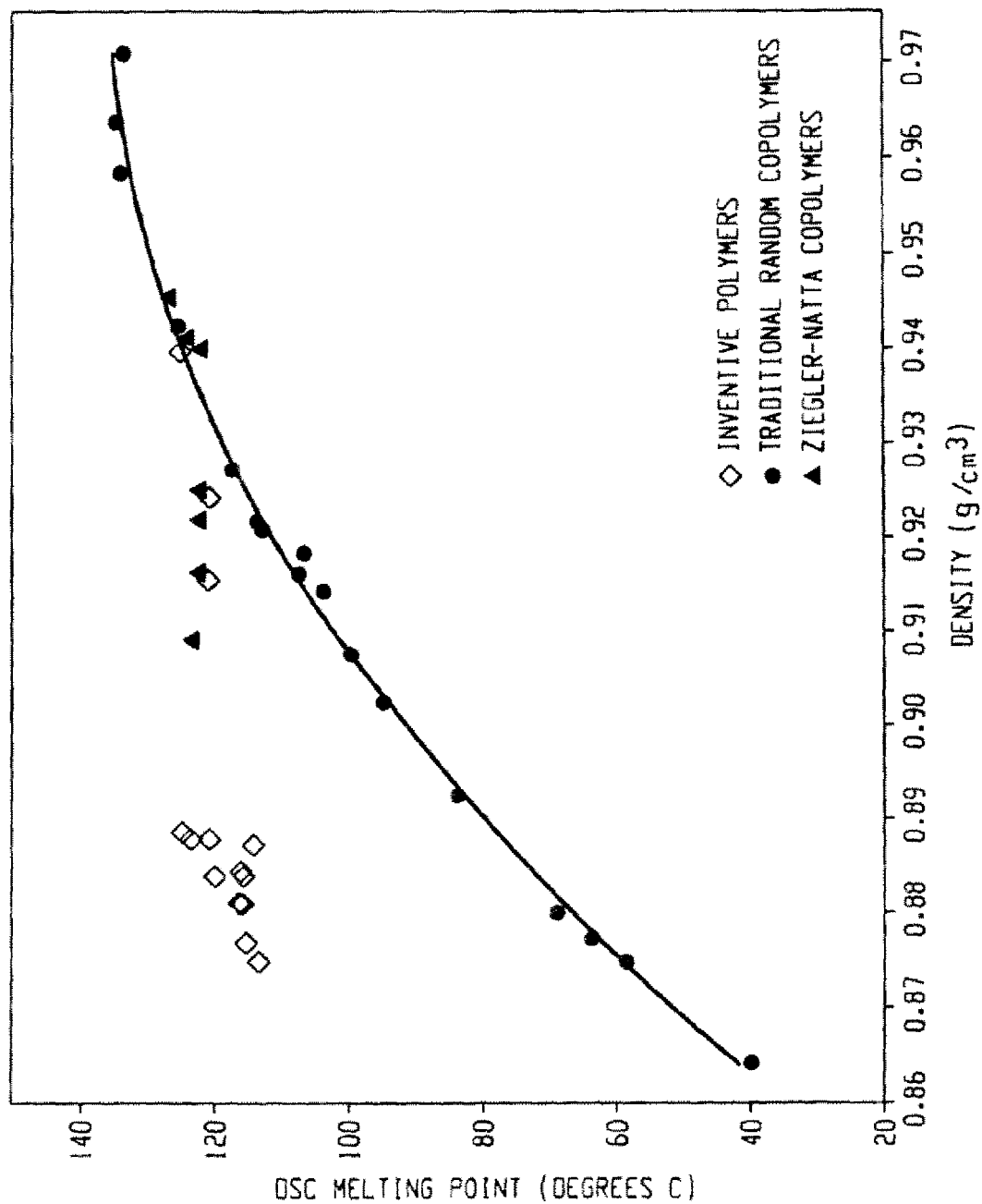
FIG. 1 shows the melting point/density relationship for ethylene/α-olefin interpolymers (represented by diamonds) as compared to traditional random copolymers (represented by circles) and Ziegler-Natta copolymers (represented by triangles).

This invention relates to the preparation of amine and/or hydroxyl functionalized polyolefins, using an in-situ melt reaction. In one aspect of the invention, the preparation of the functionalized polyolefin takes place in a batch reactor. In another aspect, the preparation takes place in a reactive extrusion process.

The functionalized polyolefins prepared therein have utility in applications where improved compatibility and/or adhesion to polar polymers, such as polyurethane, polyester, polyvinylchloride, polyamides, polyacrylates, polyacrylonitrile, cellulosics, and the like. The inventive polyolefins find particular use in shoe soles, automotive instrument panel skins, blends with thermoplastic polyurethanes, and the like. This invention also provides various in-situ melt processes that can be used to prepare said functionalized polyolefins, avoiding the need to prepare and isolate an anhydride grafted polyolefin precursor.

The functionalized polyolefins may also be used as tie layers between extruded sheets, films or profiles, for fibers or dispersions, in automotive skins, awnings, tarps, roofing construction (for example, adhesives to epoxy, urethane or acrylic-based substrates for all roofing applications, such as insulation bonding, liquid roofing, façade sealant, expansion joints, wet-room sealants, pitched roof, acrylics-adhered roof, bitumen bonding, and PUR-adhered refurbishment), paintable automotive skins and steering wheels, paintable injection molded toys, powder coatings, powder slush moldings or rotational cast moldings, consumer durables, grips, computer components, belts, adhesives, fabrics, carpets, artificial turf, coatings, wire and cable, raincoats and similar protective apparel. Additional applications are described herein.

The invention provides a process for preparing a functionalized olefin multiblock interpolymer, said process comprising the following steps:
grafting onto the backbone of an olefin multiblock interpolymer at least one compound comprising at least one "amine-reactive" group to form a grafted olefin multiblock interpolymer;
reacting a primary-secondary diamine with the grafted olefin multiblock interpolymer; and
wherein step B) takes place subsequent to step A), without the isolation of the grafted olefin multiblock interpolymer, and wherein both steps A) and B) take place in a melt reaction.

In a preferred embodiment, the primary-secondary diamine is selected from N-methyl-ethylenediamine, N-ethylethylenediamine, N-phenylethylenediamine, N-methyl-1,3-propanediamine, N-phenyl-1,2-phenylene-diamine, N-phenyl-1,4-phenylenediamine, or 4-(aminomethyl)piperidine.

In another embodiment, the invention provides a process for preparing a functionalized olefin multiblock interpolymer, said process comprising the following steps:

grafting onto the backbone of an olefin multiblock interpolymer at least one compound comprising at least one "amine-reactive" group to form a grafted olefin multiblock interpolymer;

reacting a alkanolamine with the grafted olefin multiblock interpolymer; and wherein step B) takes place subsequent to step A), without the isolation of the grafted olefin multiblock interpolymer, and wherein both steps A) and B) take place in a melt reaction.

In a preferred embodiment, the alkanolamine is selected from ethanolamine, 2-amino-1-propanol, 3-amino-1-propanol, 2-amino-1-butanol, or 2-aminobenzyl alcohol.

In another aspect, the invention provides a process for preparing a functionalized olefin multiblock interpolymer, said process comprising the following steps:

grafting onto the backbone of an olefin multiblock interpolymer at least one compound comprising at least one "amine-reactive" group to form a grafted olefin multiblock interpolymer;

reacting a primary-secondary diamine or an alkanolamine with the grafted olefin multiblock interpolymer; and wherein step B) takes place subsequent to step A), without the isolation of the grafted olefin multiblock interpolymer, and wherein both steps A) and B) take place in a melt reaction.

In a preferred embodiment, the primary-secondary diamine is selected from N-methyl-ethylenediamine, N-ethylethylenediamine, N-phenylethylenediamine, N-methyl-1,3-propanediamine, N-phenyl-1,2-phenylene-diamine, N-phenyl-1,4-phenylenediamine, or 4-(aminomethyl)piperidine.

In a preferred embodiment, the alkanolamine is selected from ethanolamine, 2-amino-1-propanol, 3-amino-2-amino-1-butanol, or 2-aminobenzyl alcohol.

In another embodiment, the invention provides a process for preparing an imide functionalized olefin multiblock interpolymer, said process comprising the following steps:

grafting onto the backbone of an olefin multiblock interpolymer, in a melt reaction, at least one compound of the following formula (IV) to form a grafted olefin multiblock interpolymer:

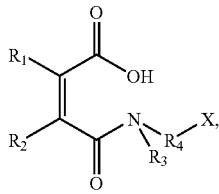

(IV)

and thermally treating the grafted olefin multiblock interpolymer to form the imide functionalized olefin multiblock interpolymer, and wherein R1 and R2 are, independently, either hydrogen or a C1-C20 hydrocarbyl radical, which is linear or branched; R3 is hydrogen or a C1-C20 hydrocarbyl radical, which is linear or branched: R4 is a hydrocarbyl di-radical, which is linear or branched; X is OH or $NHR_5$, where R5 is a hydrocarbyl radical, which is linear or branched, or a hydroxyethyl group.

In another embodiment, the invention provides a process for preparing an imide functionalized olefin multiblock interpolymer, said process comprising the following steps:

A) functionalizing the olefin multiblock interpolymer with at least one compound comprising at least one "amine-reactive" group to form a grafted olefin multiblock interpolymer;

B) blending the grafted olefin multiblock interpolymer, in a solid, non-molten form, with at least one primary-secondary diamine;

C) imbibing the primary-secondary diamine into the grafted olefin multiblock interpolymer;

D) reacting the primary-secondary diamine with the grafted olefin multiblock interpolymer to form an imide functionalized olefin multiblock interpolymer.

In a further embodiment, the imbibing step takes place at room temperature. In another embodiment, the blending step takes place at room temperature.

The olefin multiblock interpolymer in the aforementioned processes comprises an ethylene/α-olefin interpolymer, wherein the ethylene/α-olefin interpolymer has one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:
$T_m > -2002.9 + 4538.5(d) - 2422.2(d)^2$; or (4) an Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g, $\Delta T > 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; or (6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G' (25° C.), and a storage modulus at 100° C. G' (100° C.), wherein the ratio of G"(25° C.) to G' (100° C.) is in the range of about 1:1 to about 9:1.

The olefin multiblock interpolymer may be mixed or blended with one or more additional polymers. One such additional polymer is another ethylene-based polymer. In a further embodiment, the ethylene-base polymer is an second ethylene/α-olefin interpolymer, and wherein the α-olefin is a C3-C20 α-olefin. In yet a further embodiment, the α-olefin is selected from 1-propene, 1-butene, 1-hexene, and 1-octene, and mixtures thereof.

Another polymer that that the olefin multiblock interpolymer may be mixed or blended with is a propylene-based polymer. In a further embodiment, the propylene-base polymer is a propylene/ethylene interpolymer or a propylene/α-olefin interpolymer, and wherein the α-olefin is a C4-C20 α-olefin. In yet a further embodiment, the α-olefin is selected from 1-butene, 1-hexene or 1-octene.

The invention also provides a composition comprising the functionalized olefin multiblock interpolymer as described herein. In a further embodiment, the functionalized olefin multiblock interpolymer is present in an amount greater than 50 weight percent, based on the total weight of the composition.

The invention also provides a composition comprising a functionalized olefin multiblock interpolymer as described herein, and wherein the functionalized olefin multiblock interpolymer is present in an amount less than, or equal to, 20 weight percent, based on the total weight of the composition.

In another embodiment, the composition further comprising a polar polymer selected from polyesters, polyamides, polyethers, polyetherimides, polyvinylalcohols or polyvinylchlorides. In another embodiment, the functionalized olefin multiblock interpolymer is dispersed in the polar polymer to form particles thereof, and wherein the particles have a mean size less than, or equal to, 0.40 μm, preferably less than, or equal to 0.30 μm, and more preferably less than, or equal to, 0.20 μm.

The inventive methods and/or compositions may comprise a combination of two or more embodiments as described herein.

The invention also provides an over-molded article, the article formed from a polar substrate, and a molded overlay comprising an inventive composition. In another embodiment the polar substrate is formed from a composition comprising a polycarbonate, and in a further embodiment, the polar substrate has a textured surface at the interface of the substrate and the molded overlay The invention also provides a laminated structure comprising a first layer and a second layer, and wherein the first layer is formed from an inventive composition, and the second layer is formed from a composition comprising a polar material. In a further embodiment, one of the layers is in the form of a foam. In another embodiment one of the layers is in the form of a fabric. In another embodiment, laminated structure is in the form of an awning, tarp or automobile skin or steering wheel. In another embodiment, wherein the second layer is formed from a composition comprising a polycarbonate, and in a further embodiment, the second layer has a textured surface at the interface of the second layer and first layer.

The invention also provides a molded article comprising a first component and a second component, and wherein the first component is formed from a polar material, and the second component formed from an inventive composition. In a further embodiment, the article is in the form of an automobile skin, appliqué, footwear, conveyor belt, timing belt or consumer durable.

The invention also provides an article comprising at least one component formed from an inventive composition. In a further embodiment, the article is a carpet, an adhesive, a wire sheath, a cable, a protective apparel, a coating or a foam laminate. In another embodiment, the article is a tie layer between extruded sheets, films or profiles; a tie layer between cast sheets, films or profiles; an automotive skin; an awning; a tarp; a roofing construction article; a steering wheel; a powder coating; a powder slush molding; a consumer durable; a grip; a handle; a computer component; a belt; an appliqué, a footwear component, a conveyor or timing belt, or a fabric.

The inventive articles and laminated structures may comprise a combination of two or more embodiments as described herein.

I. In-Situ Functionalization Reactions Using oa Crafted Olefin Multiblock Interpolymer a) Grafting Reactions The olefin multiblock interpolymers disclosed herein may be modified by typical grafting, hydrogenation, nitrene insertion, epoxidation, or other modification reactions, well known to those skilled in the art. Preferred modifications are grafting reactions using a free radical mechanism, and more preferably, grafting reactions that result in the formation of "amine-reactive groups" and "hydroxyl-reactive groups." Such groups include, but are not limited to, anhydride groups, ester groups and carboxylic acid groups, and preferably the reactive group is an anhydride group.

Examples of reactive compounds that can be grafted onto the polymeric hydrocarbon backbone include ethylenically unsaturated carboxylic acids such as maleic acid, fumaric acid, itaconic acid, acrylic acid, methacrylic acid, and crotonic acid; acid anhydrides such as maleic anhydride and itaconic anhydride; vinyl benzyl halides such as vinyl benzyl chloride and vinyl benzyl bromide; alkyl acrylates and methacrylates such as methyl acrylate, ethyl acrylate, butyl acrylate, lauryl acrylate, methyl methacrylate, ethyl methacrylate, butyl methacrylate, and lauryl methacrylate; and ethylenically unsaturated oxiranes, such as glycidyl acrylate, glycidyl methacrylate, and glycidyl ethacrylate. Preferred ethylenically unsaturated amine-reactive compounds include maleic anhydride, acrylic acid, methacrylic acid, glycidyl acrylate, glycidyl methacrylate, with maleic anhydride being more preferred. Polypropylene grafted with maleic anhydride is a more preferred modified polymeric hydrocarbon.

The degree of incorporation or grafting of the reactive group is "application dependent," but is preferably not more than 10 weight percent, more preferably not more than 5 weight percent, more preferably not more than 2 weight percent, and most preferably not more than 1 weight percent; and preferably not less than 0.01 weight percent, more preferably not less than 0.1 weight percent, and most preferably not less than 0.2 weight percent, based on the weight of the grafting agent.

A thermal grafting process is one method for reaction; however, other grafting processes may be used, such as photo initiation, including different forms of radiation, e-beam, or redox radical generation. The functionalization may also occur at the terminal unsaturated group (e.g., vinyl group) or an internal unsaturation group, when such groups are present in the polymer.

In accordance with some embodiments of this invention, the polymers with unsaturation are functionalized, for example, with carboxylic acid producing moieties (preferably acid or anhydride moieties) selectively at sites of carbon-to-carbon unsaturation on the polymer chains, preferably in the presence of a free-radical initiator, to randomly attach carboxylic acid producing moieties, i.e., acid or anhydride or acid ester moieties, onto the polymer chains.

The amine-reactive group or hydroxyl-reactive group can be grafted to the polymer by any conventional method, typically in the presence of a free radical initiator, for example peroxides and azo compounds, or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, lauryl peroxide, and tert-butyl peracetate, t-butyl α-cumyl peroxide, di-t-butyl peroxide, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylperoxy)-1,4-diisopropylbenzene, 2,5-bis(t-butylperoxy)-2,5-dimethylhexane, and 2,5-bis(t-butylperoxy)-2,5-dimethyl-3-hexyne. A suitable azo compound is azobisisobutyl nitrite.

The grafting reaction should be performed under conditions that maximize grafts onto the olefin multiblock interpolymer backbone, and minimize side reactions, such as the homopolymerization of the grafting agent, which is not grafted to the olefin multiblock interpolymer. The grafting reaction may be performed in the melt, in solution, in the solid-state, in a swollen-state, and is preferably performed in the melt. The grafting reaction may be performed in a wide-variety of equipment, such as, but not limited to, twin screw extruders, single screw extruders, Brabenders, and batch reactors.

It has been found that mixing the resin with the grafting agent and initiator in the first stage of an extruder, at melt temperatures typically from 120° C. to 260° C., preferably from 130° C. to 250° C., has produced sufficiently grafted polymers. All individual temperature values and ranges from 120° C. to 260° C. are included herein and disclosed herein.

b) In-situ Amine Functionalization and In-situ Hydroxyl Functionalization

The process to produce amino-functionalize or hydroxy-functionalized olefin multiblock interpolymer can be carried out as one extrusion step, i.e. maleic anhydride can be grafted to the olefin multiblock interpolymer in the first section of the extruder, followed by imidization with either a primary-secondary diamine or alkanolamine in the latter section before pelletization.

Alternatively, two extruders, or melt mixing devises could be operated in series to carry out both chemical steps.

In order to prepare an amino-functionalized olefin multi-block interpolymer, without competing crosslinking reactions, in the melt, from anhydride-grafted olefin multiblock interpolymer, it is necessary to employ a primary-secondary diamine of the general formula H²N—R—NH—R", where R is at least a C2 hydrocarbyl radical. The diamine can be used in a stoichiometric excess or stoichiometric equivalence.

Suitable primary-secondary diamines include compounds of structure (I) below:

$$H_2N—R_1—NH—R_2 \qquad (I).$$

In structure (I), $R_1$ is a divalent hydrocarbon radical, and preferably a linear hydrocarbon of the formula —$(CH_2)_n$—, where n is greater than, or equal to, 2, and preferably n is from 2 to 10, more preferably from 2 to 8, and even more preferably from 2 to 6. $R_2$ is a monovalent hydrocarbon radical comprising at least 2 carbon atoms, and optionally may be substituted with a heteroatom comprising group, such as OH, or SH. Preferably R2 a linear hydrocarbon of the formula —$(CH_2)_n$—$CH_3$, where n is from 1 to ten and preferably n is from 1 to 9, more preferably from 1 to 7, and even more preferably from 1 to 5.

Additional primary-secondary diamines include, but are not limited to N-ethylethylenediamine. N-phenylethylenediamine, N-phenyl-1,2-phenylenediamine, N-phenyl-1,4-phenylenediamine, and N-(2-hydroxyethyl)-ethylenediamine. Examples of preferred primary-secondary diamines are shown below.

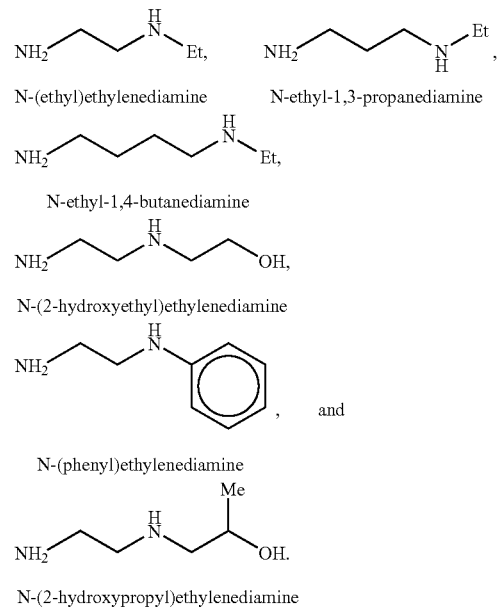

The alkanolamine is a compound comprising an amine group and at least one hydroxyl group, preferably only one hydroxyl group. The amine can be a primary or a secondary amine, and is preferably a primary amine. The polyamine is a compound that contains at least two amine groups, preferably only two amine groups.

Suitable alkanolamines are those of structure (II) below:

$$H_2N—R_1—OH \qquad (II).$$

In structure (II), $R_1$ is a divalent hydrocarbon radical, and preferably a linear hydrocarbon of the formula —$(CH_2)_n$—, where n is greater than, or equal to, 2, and preferably n is from 2 to 10, more preferably from 2 to 8, and even more preferably from 2 to 6.

Additional alkanolamines include, but are not limited to, ethanolamine, 2-amino-1-propanol, 3-amino-1-propanol, 2-amino-1-butanol and 2-aminobenzyl alcohol.

Examples of preferred alkanolamines are shown below.

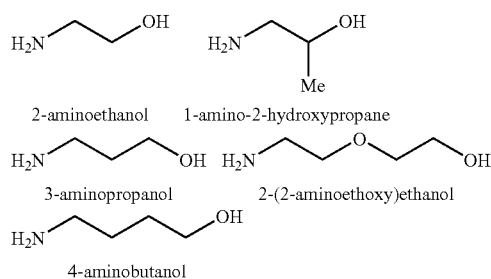

Additional examples of suitable alkanolamines and suitable diamines are represented by the following formula (III):

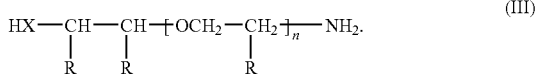

In formula (III). X is O or NR' (R' is alkyl) and each R is independently H, CH$_3$, or CH$_2$CH$_3$; and n is from 0 to 50. The disclosure and preparation of hydroxylamines can be found in U.S. Pat. Nos. 3,231,619; 4,612.335, and 4,888,446, which teachings are incorporated herein by reference. Examples of preferred alkanolamines include 2-aminoethanol, 1-amino-2-propanol, 2-amino-1-propanol, 3-amino-1-propanol, 2-(2-aminoethoxy)ethanol, 1-amino-2-butanol, 2-amino-3-butanol, and polyoxyalkylene glycol amines. A preferred alkanolamine is 2-aminoethanol.

In one embodiment, a maleic anhydride olefin multiblock interpolymer is functionalized with a primary-secondary diamine or with an alkanolamine.

In a further embodiment, the level of maleic anhydride used, is from 0.10 weight percent to 5.0 weight percent, preferably from 0.50 weight percent to 3.0 weight percent, and more preferably from 1.0 weight percent to 2.0 weight percent, based on the weight of the unfunctionalized grafted olefin multiblock interpolymer.

In a further embodiment, the level of peroxide used, is from 0.01 weight percent to 0.5 weight percent, preferably from 0.05 weight percent to 0.3 weight percent, and more preferably from 0.1 weight percent to 0.2 weight percent, based on the weight of the unfunctionalized grafted olefin multiblock interpolymer.

In yet a further embodiment, the level of primary-secondary diamine or alkanolamine used, is from 1 to 10 mole equivalents, preferably from 2 to 8 mole equivalents, and more preferably from 4 to 6 mole equivalents of amine, relative to grafted anhydride.

II. In-Situ Functionalization Reactions Using Maleamic Acid

Hydroxy- and amino-functionalized olefin multiblock interpolymers, e.g., ethylene-octene copolymers, can also be prepared in one step by peroxide-initiated grafting of the corresponding maleamic acids, or derivative thereof, which is formed by reaction of maleic anhydride and alkanolamine or primary-secondary diamine.

Maleamic acids are shown in Structure (IV) below:

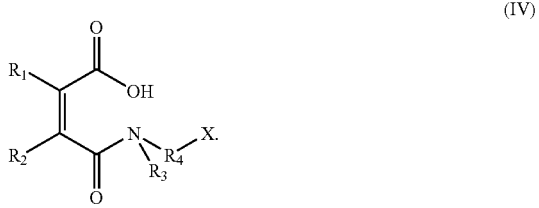

In structure (IV), R1 and R2 are, independently, either hydrogen or a C1-C20 hydrocarbyl radical, which is linear or branched; R3 is hydrogen or a C1-C20 hydrocarbyl radical, which is linear or branched; R4 is a hydrocarbyl di-radical, which is linear or branched; X is OH or NHR$_5$, where R5 is a hydrocarbyl radical, which linear or branched, or a hydroxyethyl group. In a preferred embodiment, R1 and R2 are, independently, either hydrogen, or a C1-C10, preferably a C1-C8 and more preferably a C1-C6, hydrocarbyl radical, which is linear or branched. In a preferred embodiment, R3 is either hydrogen, or a C1-C10, preferably a C1-C8, and more preferably a C1-C6, hydrocarbyl radical, which is linear or branched. In a preferred embodiment, R4 is a C1-C20, preferably a C1-C10, and more preferably a C1-C8, and even more preferably a C1-C6 hydrocarbyl radical, which is linear or branched.

In a preferred embodiment, R5 is a C1-C20, preferably a C1-C10, and more preferably a C1-C8, and even more preferably a C1-C6 hydrocarbyl radical, which is linear or branched. In another embodiment, R5 is a linear —(CH$_2$)$_n$CH$_3$, where n is greater than, or equal to 1, and preferably n is from 1 to 9, more preferably from 1 to 7, and even more preferably from 1 to 5. Additional examples of R5, include, but are not limited to, the following structures: —CH$_3$, —CH$_2$CH$_3$, —CH$_2$CH$_2$CH$_3$, —CH$_2$CH$_2$CH$_2$CH$_3$, —CH$_2$(CH$_3$)CH$_3$, —CH$_2$(CH$_3$)CH$_2$CH$_3$, —CH$_2$(CH$_3$)CH$_3$, —CH$_2$(CH$_3$)CH$_2$CH$_2$CH$_3$, —CH$_2$CH$_2$(CH$_3$)CH$_2$CH$_3$, and —CH$_2$CH$_2$CH$_2$(CH$_3$)CH$_3$.

Additional maleamic acid structures are shown below. In each structure, R3 and R4 are defined as above.

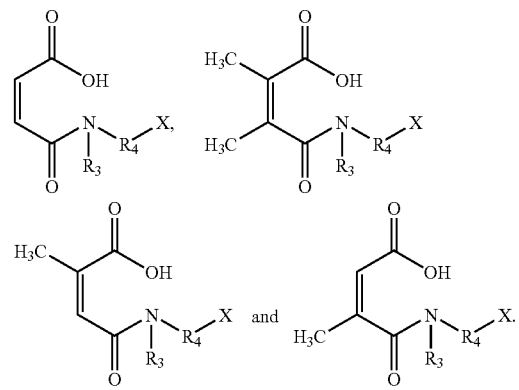

Preferably the maleamic acid, is shown in structure (V) below:

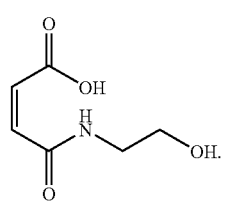

The olefin multiblock interpolymer is functionalized with a maleamic acid as shown in structure (V). In one embodiment, the level of maleamic acid used, is from 0.10 weight percent to 5.0 weight percent, preferably from 0.50 weight percent to 3.0 weight percent, and more preferably from 1.0 weight percent to 2.0 weight percent, based on the weight of the unfunctionalized grafted olefin multiblock interpolymer.

In a further embodiment, the level of peroxide used, is from 0.01 weight percent to 0.5 weight percent, preferably from 0.05 weight percent to 0.3 weight percent, and more preferably from 0.1 weight percent to 0.2 weight percent of the unfunctionalized grafted olefin multiblock interpolymer.

In a further embodiment, the level of peroxide used, is from 0.01 weight percent to 1 weight percent, preferably from 0.01 weight percent to 0.5 weight percent, and more preferably from 0.05 weight percent to 0.3 weight percent, and even more preferably from 0.1 weight percent to 0.2 weight percent, based on the amount of unfunctionalized grafted olefin multiblock interpolymer.

III. Diamine Imbibe Process

The olefin multiblock interpolymers as described herein may also be functionalized using a diamine imbibing process. Here, an olefin multiblock interpolymer is first functionalized with a group reactive with amine functionality. Preferably, the olefin multiblock interpolymer is functionalized with an anhydride group. At least one diamine is mixed with the functionalized olefin multiblock interpolymer at a temperature below the melting point of the olefin multiblock interpolymer, and preferably at room temperature. The diamine is allowed to absorb or imbibe into the olefin multiblock interpolymer, and reacts with diamine reactive group to form a succinamic acid. The reaction of the diamine with the diamine reactive functional group to form the imide ring, can then be completed by subjecting the mixture to a thermal treatment, such as in a melt extrusion process. Suitable diamines include those diamines discussed herein. The imbibing process helps to ensure that the diamine is thoroughly mixed with the olefin multiblock interpolymer for an efficient functionalization reaction.

Suitable primary-secondary diamines include compounds of structure (VI) below:

In structure (I), $R_1$ is a divalent hydrocarbon radical, and preferably a linear hydrocarbon of the formula $-(CH_2)_n-$, where n is greater than, or equal to, 2, and preferably n is from 2 to 10, more preferably from 2 to 8, and even more preferably from 2 to 6. $R_2$ is a monovalent hydrocarbon radical comprising at least 2 carbon atoms, and optionally may be substituted with a heteroatom containing group, such as OH or SH. Preferably R2 a linear hydrocarbon of the formula $-(CH_2)_n-CH_3$, where n is from 0 to ten, and preferably n is from 0 to 9, more preferably from 0 to 7, and even more preferably from 0 to 5.

Suitable primary-secondary diamines include, but are not limited to, N-methyl-ethylenediamine, N-ethylethylenediamine, N-phenylethylenediamine, N-methyl-1,3-propanediamine, N-methylenediamine, N-phenyl-1,2-phenylenediamine, N-phenyl-1,4-phenylenediamine, 1-(2-aminoethyl)-piperazine, and N-(2-hydroxyethyl)-ethylenediamine. Examples of preferred primary-secondary diamines are shown below.

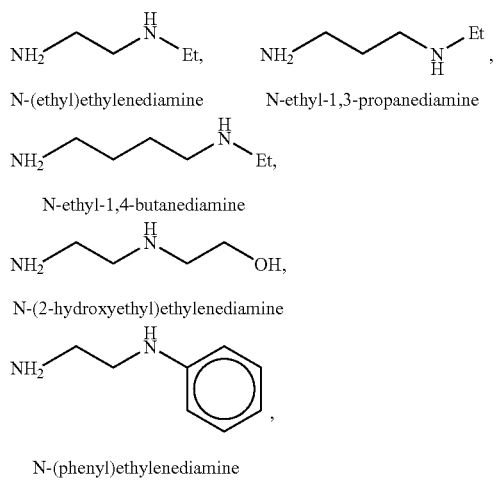

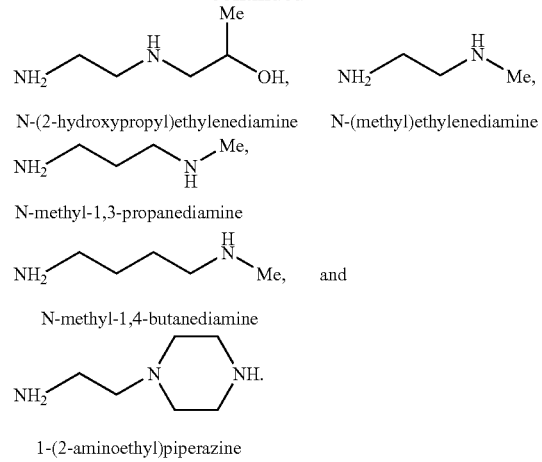

IV. Olefin Multiblock Interpolymers Used as Base Polymer in the Crafting and Functionalization Reactions The polyolefin used as a base polymer in the in the processes entitled "I. In-situ Functionalization Reactions using of a Grafted Olefin multiblock interpolymer", "II. In-situ Functionalization Reactions using Maleamic Acid", and "III. Diamine Imbibe Process" above typically comprises an olefin multiblock interpolymer, preferably ethylene/α-olefin multiblock interpolymer, wherein the interpolymer has one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2; \text{ or}$$

(4) an Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g.}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G' (25° C.), and a storage modulus at 100° C., G' (100° C.), wherein the ratio of G' (25° C.) to G' (100° C.) is in the range of about 1:1 to about 9:1.

The olefin multiblock interpolymers typically comprise ethylene and one or more copolymerizable α-olefin comonomers in polymerized form, characterized by multiple blocks or segments of two or more polymerized monomer units differing in chemical or physical properties. That is, the olefin multiblock interpolymers, preferably ethylene/α-olefin interpolymers, are block interpolymers, preferably multiblock interpolymers or copolymers. The terms "interpolymer" and copolymer" are used interchangeably herein. In some embodiments, the multiblock copolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multiblock polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376, 835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "olefin multiblock interpolymer", "multiblock copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multiblock copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

The ethylene/α-olefin interpolymers used in embodiments of the invention (also sometimes referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multiblock copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 - 13141(d) - 6720.3(d)^2, \text{ and more preferably}$$

$$T_m \geq 858.91 - 1825.3(d) + 1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
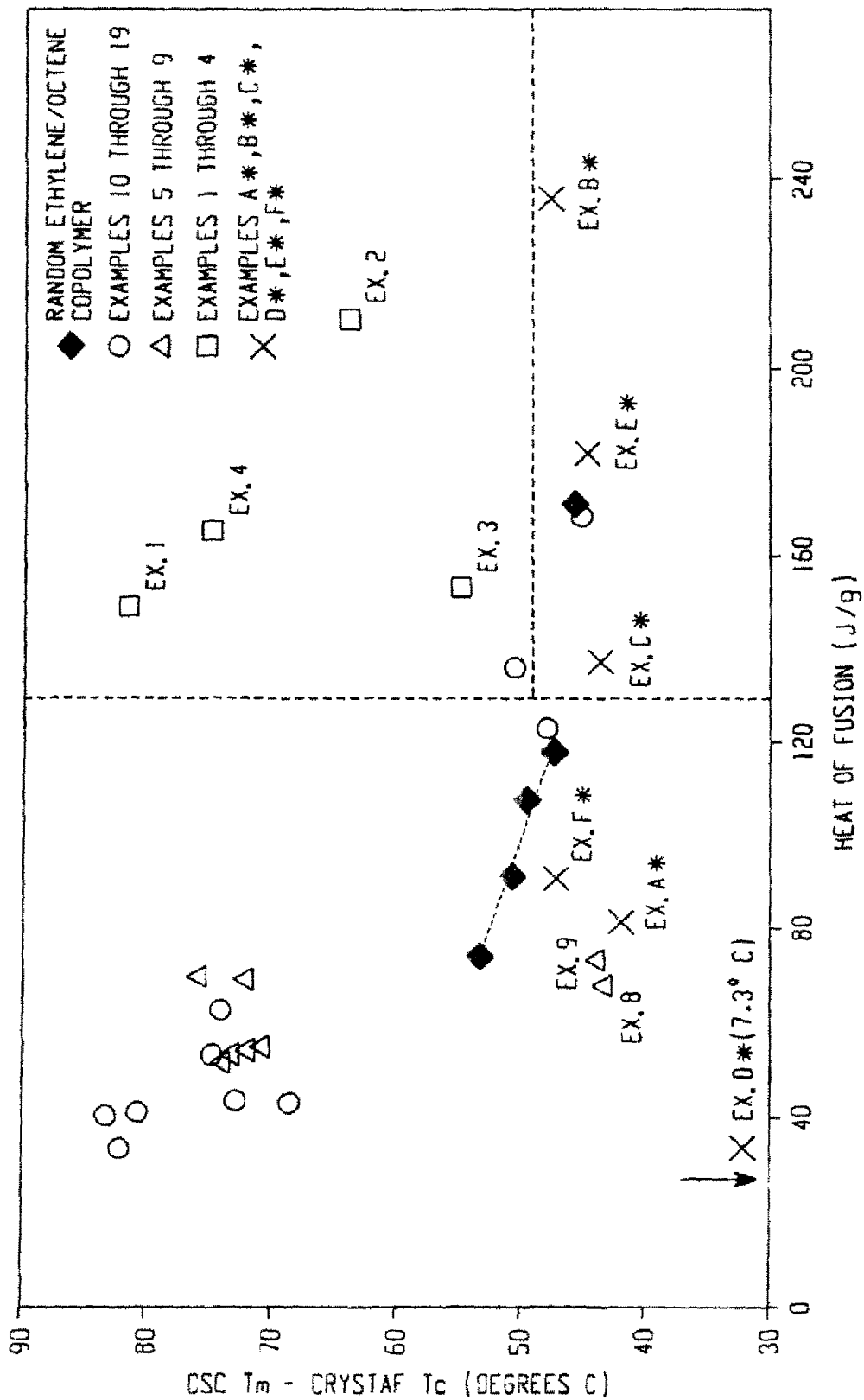
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95,$$

for ΔH up to 130 J/g. Moreover, ΔT is equal to or greater than 48° C. for ΔA greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation $\Delta T = -0.1299 (\Delta H) + 62.81$.

In yet another aspect, the ethylene/α-olefin interpolymers have a molecular fraction which elutes between 40° C. and 1.30° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ and preferably}$$

$$Re \geq 1491 - 1629(d); \text{ and more preferably}$$

$$Re \geq 1501 - 1629(d); \text{ and even more preferably}$$

$$Re \geq 1511 - 1629(d).$$

Figure 3:
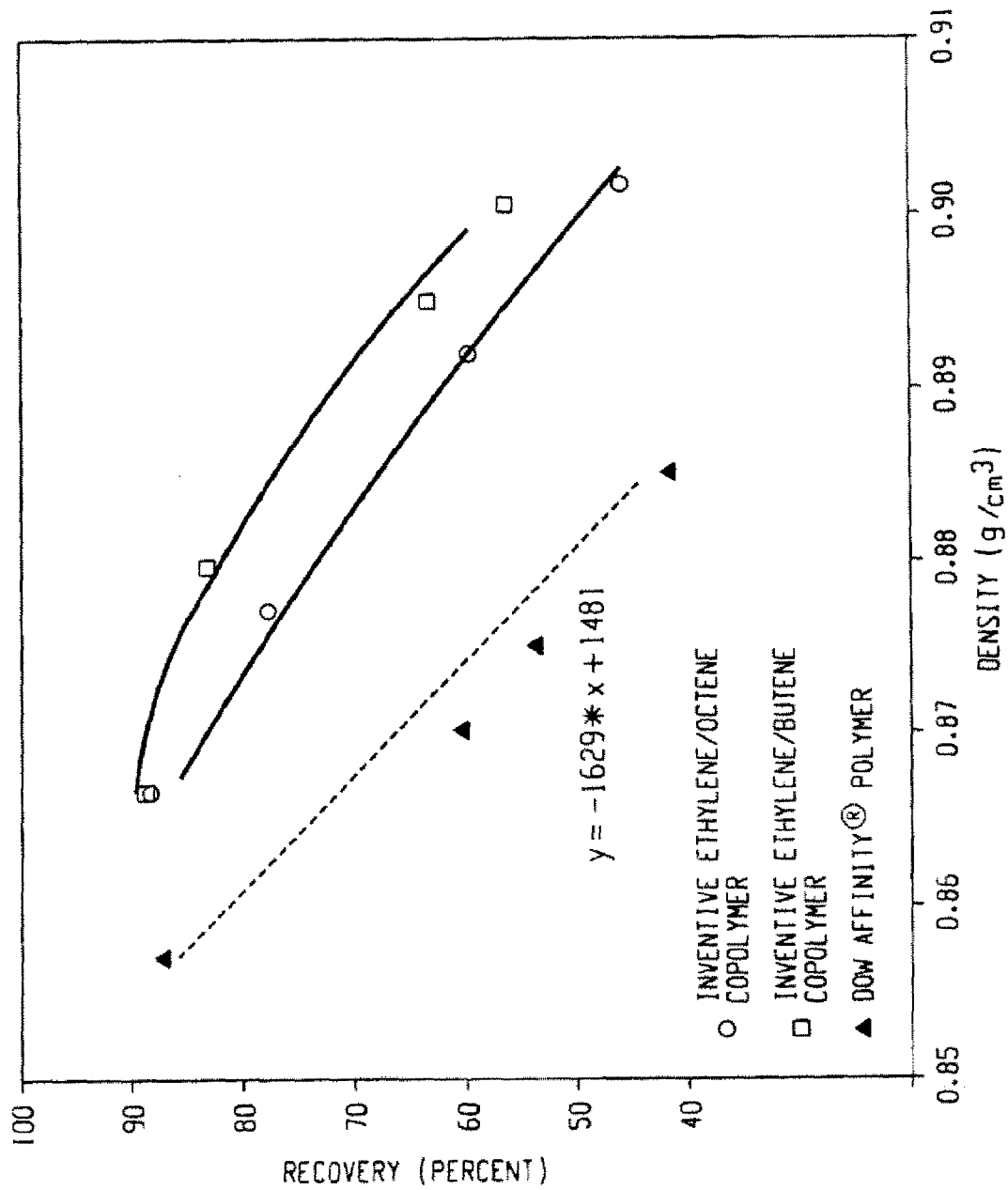
FIG. 3 shows the effect of density on elastic recovery for unoriented films made from ethylene/α-olefin interpolymers (represented by the squares and circles) and traditional copolymers (represented by the triangles which are various Dow AFFINITY® polymers). The squares represent ethylene/butene interpolymers; and the circles represent ethylene/octene interpolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength ≧11 MPa, more preferably a tensile strength ≧13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G' (25° C.)/G' (100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multiblock copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multiblock copolymers are those comprising 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multiblock copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl:methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013)T+20.07, more preferably greater than or equal to the quantity (−0.2013)T+21.07, where T is the numerical value of the peak elution temperature of the TREF fraction being compared, measured in ° C.

Figure 4:
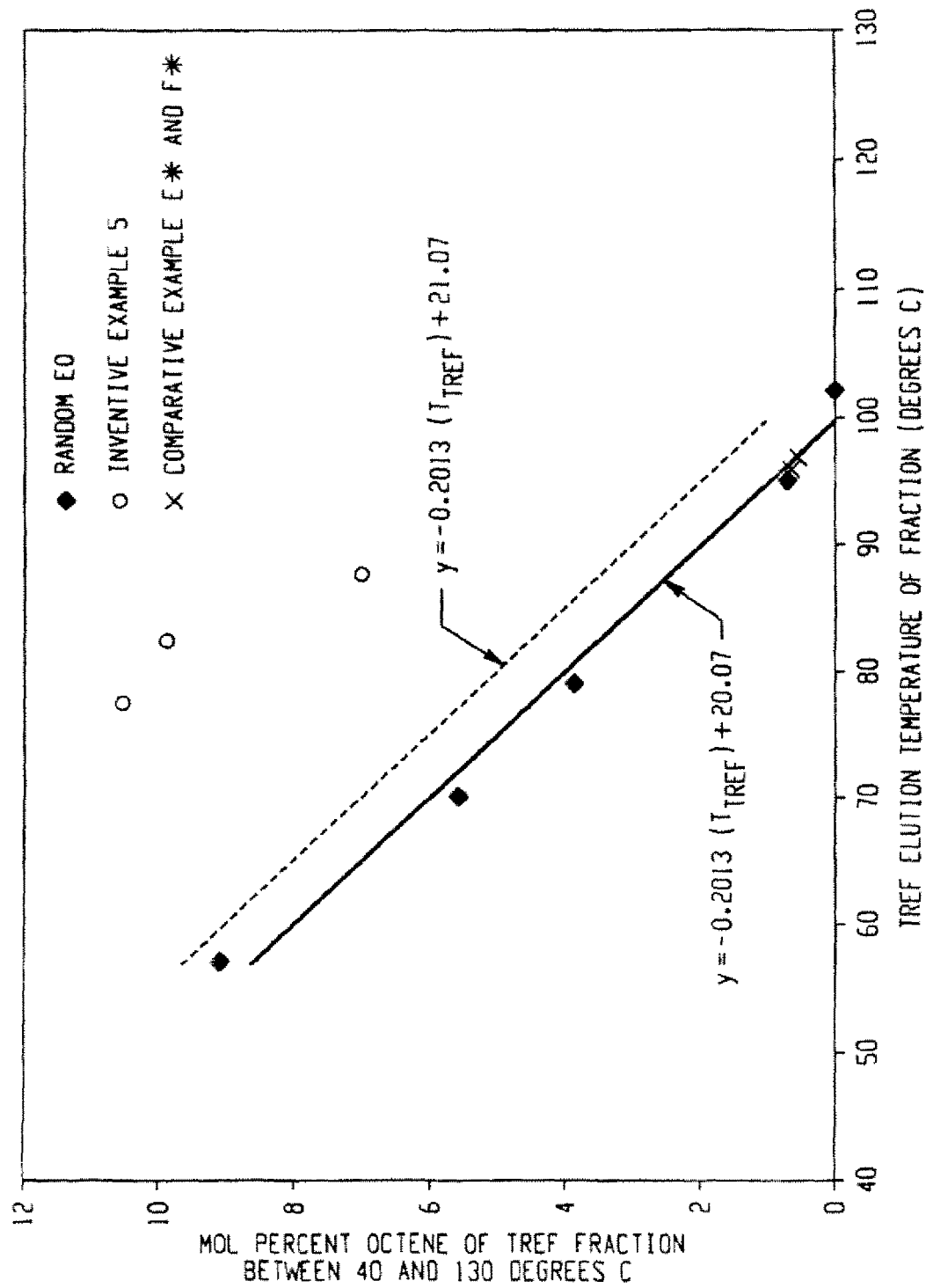
FIG. 4 is a plot of octene content of TREF fractionated ethylene/1-octene copolymer fractions versus TREF elution temperature of the fraction for the polymer of Example 5 (represented by the circles) and comparative polymers E and F (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013)T+20.07 (solid line). The line for the equation (−0.2013)T+21.07 is depicted by a dotted line. Also depicted are the comonomer contents for fractions of several block ethylene/1-octene interpolymers of the invention (multiblock copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
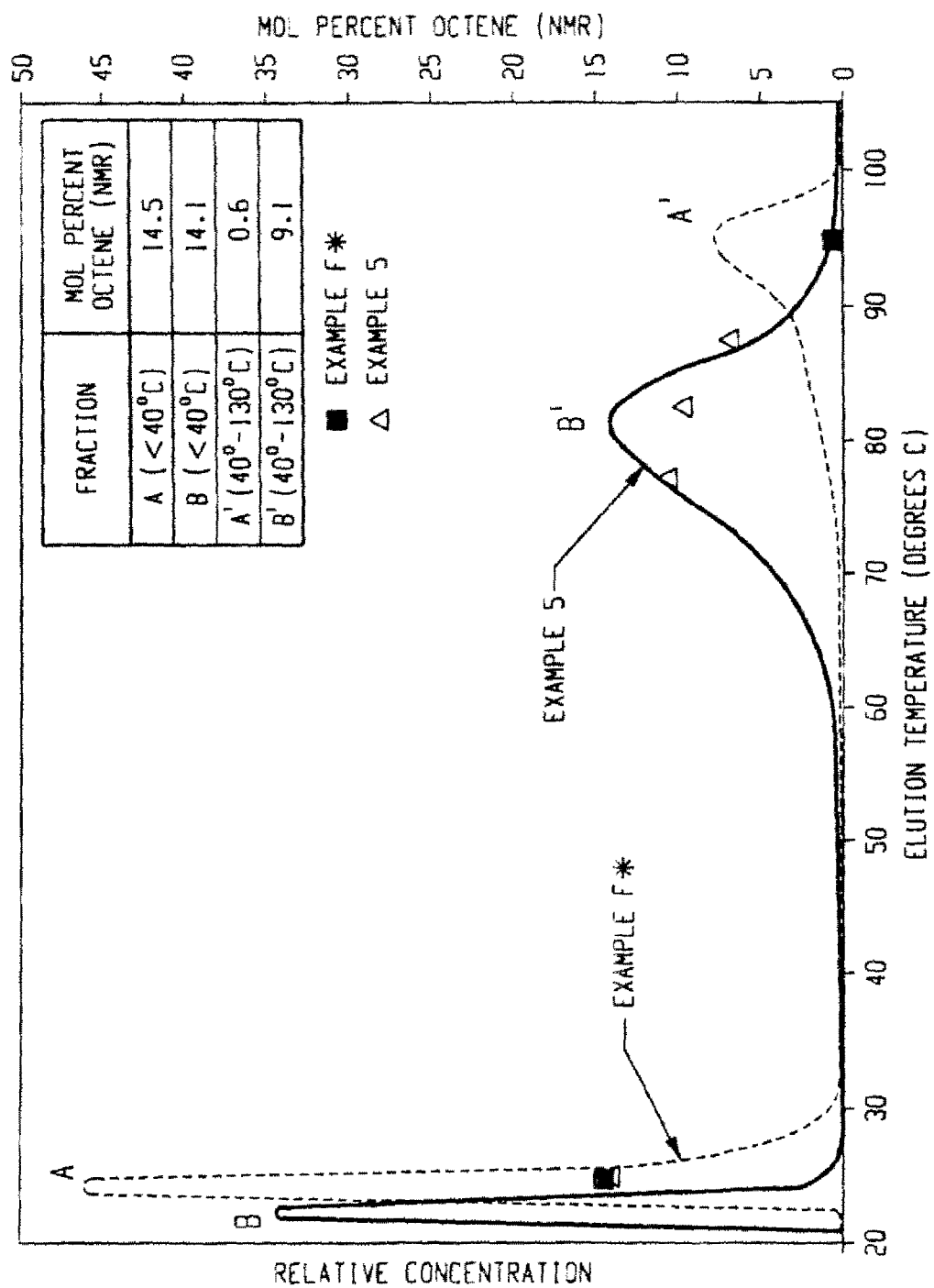
FIG. 5 is a plot of octene content of TREF fractionated ethylene/1-octene copolymer fractions versus TREF elution temperature of the fraction for the polymer of Example 5 (curve 1) and for comparative F (curve 2). The squares represent Example F*; and the triangles represent Example 5.

FIG. 5 graphically displays the TREF curve and comonomer contents of polymer fractions for Example 5 and comparative F to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration, curve may be constructed for interpolymers comprising different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multiblock copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.1356)T+13.89, more preferably greater than or equal to the quantity (−0.1356)T+14.93, and most preferably greater than or equal to the quantity (−0.2013)T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.2013)T+20.07, more preferably greater than or equal to the quantity (−0.2013)T+21.07, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction}) + 135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(ATREF \text{ elution temperature in Celsius}) - 136.58,$$

The inventive block interpolymers have a molecular fraction which elutes between 40° C. and 130° C., when fractionated using TREF increments, characterized in that every fraction that has an ATREF elution temperature between 40° C. and less than about 76° C. has a melt enthalpy (heat of fusion) as measured by DSC, corresponding to the equation:

$$\text{Heat of fusion (J/gm)} \leq (1.1312)(ATREF \text{ elution temperature in Celsius}) + 22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith. Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{\text{Ln}P_X - \text{Ln}P_{XO}}{\text{Ln}P_A - \text{Ln}P_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR, $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K., $P_A$ is 1.

$T_{AB}$ is the ATREF temperature for a random copolymer of the same composition and having an ethylene mole fraction of $P_{AB}$. $T_{AB}$ can be calculated from the following equation:

$$Ln\, P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$Ln\, P = -237.83/T_{ATREF} + 0.639$$

$T_{XO}$ is the ATREF temperature for a random copolymer of the same composition and having an ethylene mole fraction of $P_X$. $T_{XO}$ can be calculated from $\text{Ln}P_X = \alpha/T_{XO} + \beta$. Conversely, $P_{XO}$ is the ethylene mole fraction for a random copolymer of the same composition and having an ATREF temperature of $T_X$, which can be calculated from $\text{Ln }P_{XO} = \alpha/T_X + \beta$.

Once the block index (BI) for each preparative TREF fraction is obtained, the weight average block index, ABI, for the whole polymer can be calculated. In some embodiments. ABI is greater than zero but less than about 0.3 or from about 0.1 to about 0.3. In other embodiments. ABI is greater than about 0.3 and up to about 1.0. Preferably. ABI should be in the range of from about 0.4 to about 0.7, from about 0.5 to about 0.7, or from about 0.6 to about 0.9. In some embodiments. ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments. ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 kg or less; (3) an ethylene content of at least 50 weight percent; (4) a glass transition temperature, $T_g$, of less than −25° C., more preferably less than −30° C., and/or (5) one and only one $T_m$.

Figure 6:
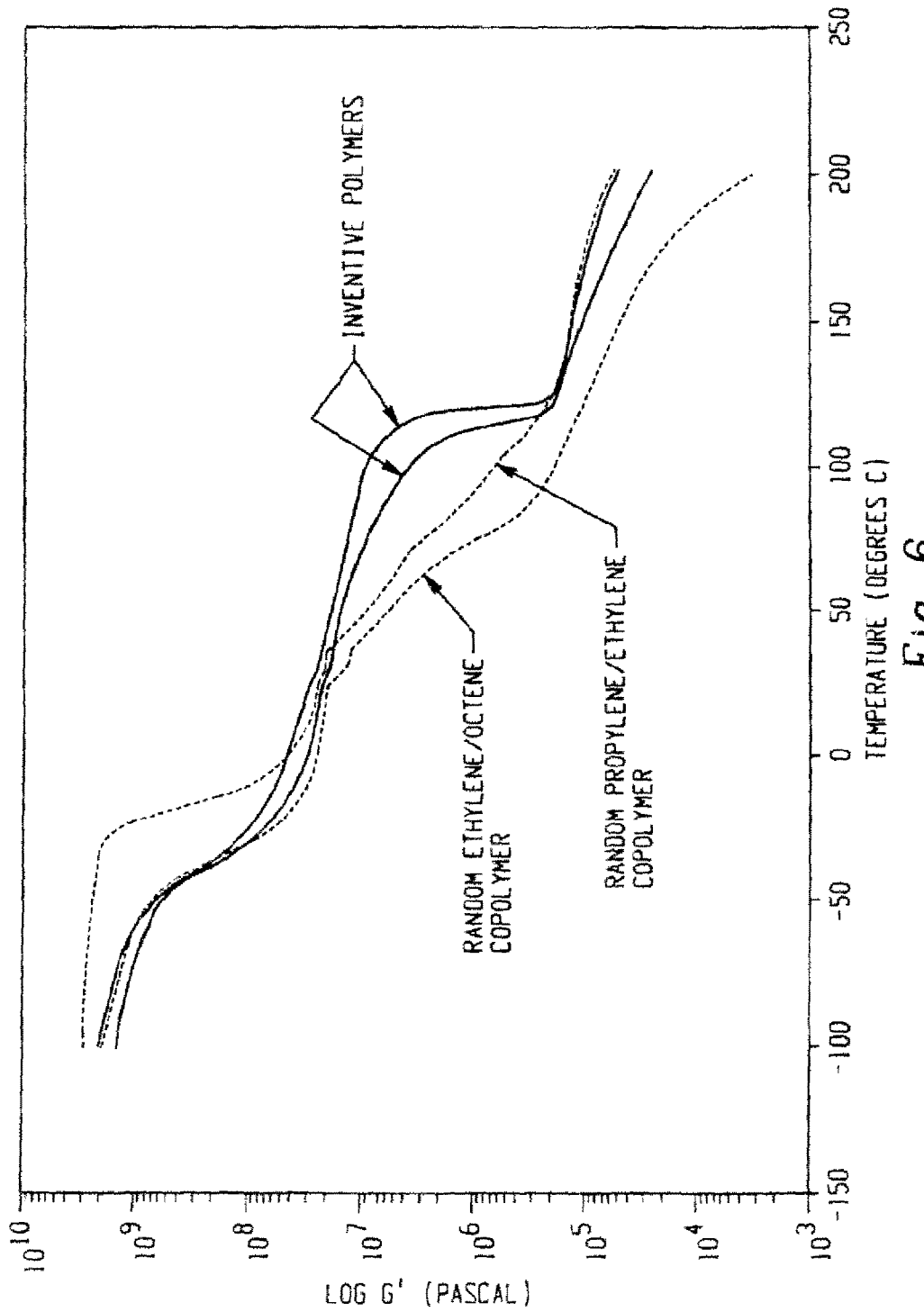
FIG. 6 is a graph of the log of storage modulus as a function of temperature for comparative ethylene/1-octene copolymer (curve 2) and propylene/ethylene-copolymer (curve 3) and for two ethylene/1-octene block copolymers made with differing quantities of chain shuttling agent (curves 1).

Further, the inventive polymers can have, alone or in combination with any other properties disclosed herein, a storage modulus, G', such that log(G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
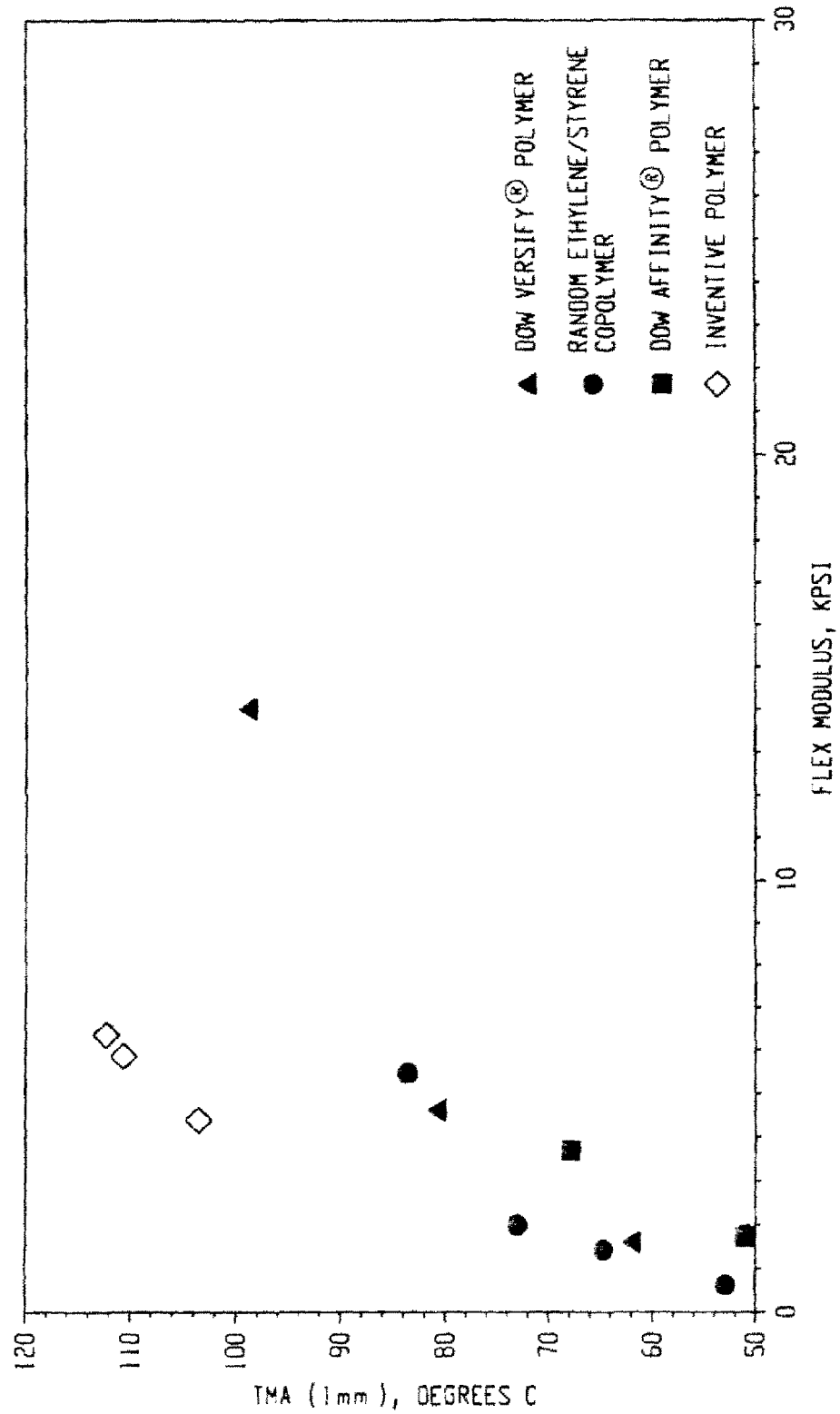
FIG. 7 shows a plot of TMA (1 mm) versus flex modulus for some polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm$^3$ and preferably for ethylene comprising polymers from 0.85 g/cm$^3$ to 0.97 g/cm$^3$. In certain embodiments, the density of the ethylene/α-olefin polymers ranges from 0.860 to 0.925 g/cm$^3$ or 0.867 to 0.910 g/cm$^3$.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index.

(B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

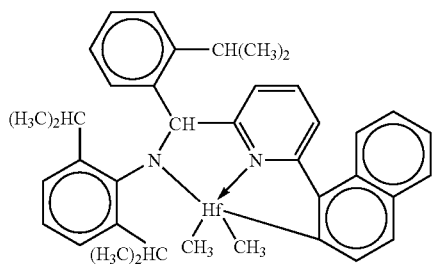

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

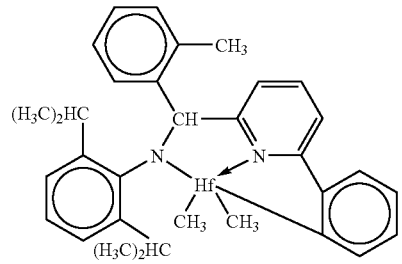

Catalyst (A3) is bis[N,N'''-(2,4,6-tri(methylphenyl)amido)ethylenediamine]hafnium dibenzyl.

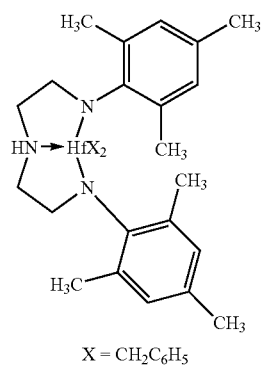

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

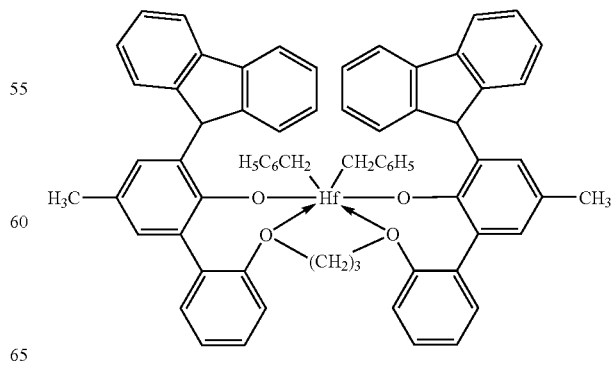

Catalyst (B1) is 1,2-bis-(3,5-di-t-butylphenylene)(1-(N-(1-methylethyl)immino)methyl)(2-oxoyl) zirconium dibenzyl

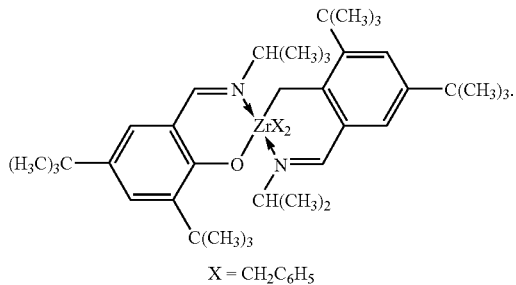

Catalyst (B2) is 1,2-bis-(3,5-di-t-butylphenylene)(1-(N-(2-methylcyclohexyl)-immino)methyl)(2-oxoyl) zirconium dibenzyl

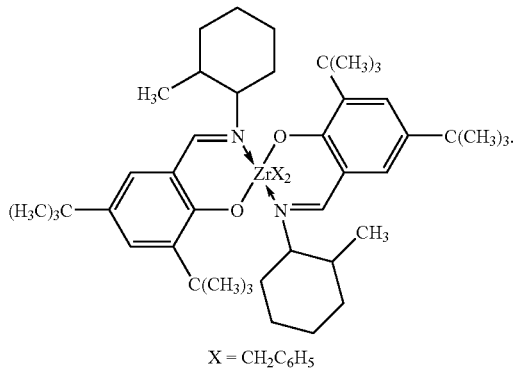

Catalyst $C_1$) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

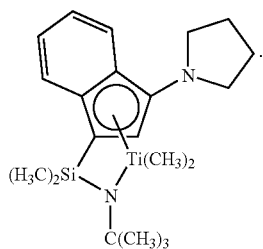

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

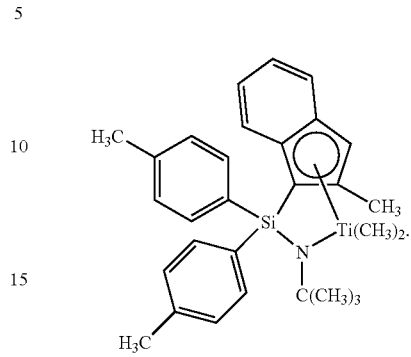

Catalyst (C3) is (t-butylamido)di(4-methylphenyl)(2-methyl-1,2,3,3a-8a-η-s-indacen-1-yl)silanetitanium dimethyl prepared substantially according to the teachings of US-A-2003/004286:

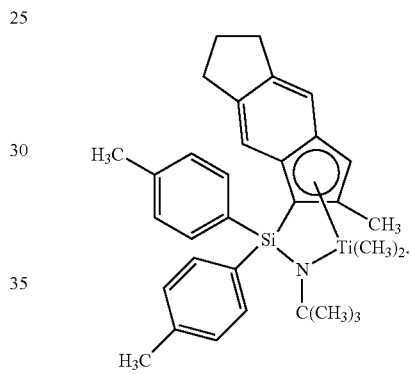

Catalyst (D1) is bis(dimethyldisiloxane)(indene-1-yl)zirconium dichloride available from Sigma-Aldrich:

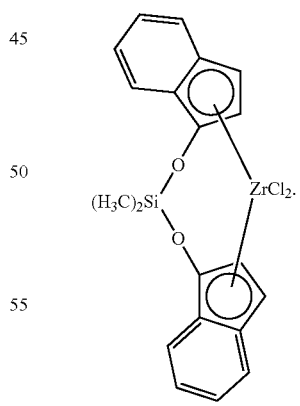

Shuttling Agents The shuttling agents employed include diethylzinc, di(i-butyl)zinc, di(n-hexyl)zinc, triethylaluminum, trioctylaluminum, triethylgallium, butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide ethylzinc (2,6-diphenylphenoxide), and ethylzinc (t-butoxide).

Preferably, the foregoing process takes the form of a continuous solution process for forming block copolymers, especially multiblock copolymers, preferably linear multiblock copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multiblock copolymers, especially linear multiblock copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer comprising the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers comprising the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multiblock copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like, 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds comprising vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alphan olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2$=$CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multiblock EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multiblock elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers useful in the processes described above in "I. In-situ Functionalization Reactions using of a Grafted Olefin multiblock interpolymer", "II. In-situ Functionalization Reactions using Maleamic Acid", and/or "III. Diamine Imbibe Process" may be partially functionalized so long as such functionalization does not interfere with the process. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927.888, and 4,950,541, the disclosures of these patents are incorporated herein by reference in their entirety. One particularly useful functional group is malic anhydride.

The amount of the functional group present is not so much that it interferes with the inventive processes. Typically, the functional group can be present in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

Polyolefin Blends

In another embodiment of the invention, one or more polyolefins may be mixed or blended with the olefin multiblock interpolymers used as the base polymer so that the blend is subject to the functionalization reactions. The functionalized polymers of the invention may also be used as a concentrate that can be mixed or blended with unfunctionalized polyolefin to achieve lower net levels of functionality in the final product.

Ethylene-Based Polymers May be Blended with the Olefin Multiblock Interpolymer

As discussed above, suitable ethylene-base polymers may be mixed or blended with the olefin multiblock interpolymers used as the base polymer and then the blend may be functionalized. Such polymers include, for example, high density polyethylene (HDPE), linear low density polyethylene (LLDPE), ultra low density polyethylene (ULDPE), homogeneously branched linear ethylene polymers, and homogeneously branched substantially linear ethylene polymers (that is homogeneously branched long chain branched ethylene polymers).

High density polyethylene (HDPE) typically has a density of about 0.94 to about 0.97 g/cc. Commercial examples of HDPE are readily available in the market. Other suitable ethylene polymers include low density polyethylene (LDPE), linear low density polyethylene (LLDPE), and linear very low density polyethylene (VLDPE). Typically the low density polyethylene (LOPE) is made under high-pressure, using free-radical polymerization conditions. Low density polyethylene typically has a density from 0.91 to 0.94 g/cc.

Linear low density polyethylene (LLDPE) is characterized by little, if any, long chain branching, in contrast to conventional LDPE. The processes for producing LLDPE are well known in the art and commercial grades of this polyolefin resin are available. Generally, LLDPE is produced in gas-phase fluidized bed reactors or liquid phase solution process reactors, using a Ziegler-Natta catalyst system.

The linear low density polyethylene (LLDPE), ultra low density polyethylene (LLDPE), homogeneously branched linear ethylene interpolymers, or homogeneously branched substantially linear ethylene interpolymer, typically have polymerized therein at least one α-olefin. The term "interpolymer" used herein indicates the polymer can be a copolymer, a terpolymer or any polymer having more than one polymerized monomer. Monomers usefully copolymerized with ethylene to make the interpolymer include the C3-C20 α-olefins, and especially propylene, 1-butene, 1-pentene, 1-hexene, 4-methyl-1-pentene, 1-heptene and 1-octene. Especially preferred comonomers include propylene, 1-butene, 1-hexene and 1-octene.

Overall, suitable ethylene polymers have a melt index, 12, less than, or equal to, 1000 g/10 min, preferably less than, or equal to, 500 g/10 min, more preferably less than, or equal to, 100 g/10 min, most preferably less than, or equal to, 50 g/10 min, as measured in accordance with ASTM 1238, Condition 190° C./12.16 kg.

Commercial examples of suitable ethylene-base interpolymers include ATTANE™, AFFINITY™, DOWLEX™, ELITE™, all available from The Dow Chemical Company; and EXCEED™ and EXACT™ available from Exxon Chemical Company.

The terms "homogeneous" and "homogeneously-branched" are used in reference to an ethylene/α-olefin interpolymer, in which the α-olefin comonomer is randomly distributed within a given polymer molecule, and substantially all of the polymer molecules have the same ethylene-to-comonomer ratio. The homogeneously branched ethylene interpolymers that can be used in the practice of this invention include linear ethylene interpolymers, and substantially linear ethylene interpolymers.

Included amongst the homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes, as described, for example, by Elston in U.S. Pat. No. 3,645,992. Commercial examples of homogeneously branched linear ethylene/α-olefin interpolymers include TAFMER™ polymers supplied by the Mitsui Chemical Company and EXACT™ polymers supplied by ExxonMobil Chemical Company.

The substantially linear ethylene interpolymers used in the present invention are described in U.S. Pat. Nos. 5,272,236; 5,278,272; 6,054,544; 6,335,410 and 6,723.8.10; the entire contents of each are herein incorporated by reference. The substantially linear ethylene interpolymers are those in which the comonomer is randomly distributed within a given interpolymer molecule, and in which substantially all of the interpolymer molecules have the same ethylene/comonomer ratio within that interpolymer. In addition, the substantially linear ethylene interpolymers are homogeneously branched ethylene interpolymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 total carbons (including both backbone and branch carbons) to 3 long chain branches per 1000 total carbons. The length of a long chain branch is longer than the carbon length of a short chain branch formed from the incorporation of one comonomer into the polymer backbone.

Some polymers may be substituted with 0.01 long chain branches per 1000 total carbons to 1 long chain branch per 1000 total carbons, or from 0.05 long chain branches per 1000 total carbons to 1 long chain branch per 1000 total carbons, and especially from 0.3 long chain branches per 1000 total carbons to 1 long chain branch per 1000 total carbons. Commercial examples of substantially linear polymers include the ENGAGE™ polymers and AFFINITY™ polymers (both available from The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE) made, for example, using the technique disclosed by Anderson et at in U.S. Pat. No. 4,076, 698); nor are they in the same class as high pressure, free-radical initiated, highly branched polyethylenes, such as, for example, low density polyethylene (LOPE), ethylene-acrylic acid (EAA) copolymers and ethylene vinyl acetate (EVA) copolymers.

The homogeneously branched, substantially linear ethylene interpolymers useful in the invention have excellent processability, even though they have a relatively narrow molecular weight distribution. Surprisingly, the melt flow ratio ($I_{10}/I_2$), according to ASTM D 1238, of the substantially linear ethylene interpolymers can be varied widely, and essentially independently of the molecular weight distribution ($M_w/M_n$ or MWD). This surprising behavior is completely contrary to conventional homogeneously branched linear ethylene interpolymers, such as those described, for example, by Elston in U.S. Pat. No. 3,645,992, and heterogeneously branched conventional Ziegler-Natta polymerized linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the $I_{10}/I_2$ value also increases.

"Long chain branching (LCB)" can be determined by conventional techniques known in the industry, such as $^{13}$C nuclear magnetic resonance ($^{13}$C NMR) spectroscopy, using, for example, the method of Randall (Rev. Micromole. Chem. Phys., C29 (2&3), p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

In contrast to "substantially linear ethylene polymer." "linear ethylene polymer" means that the polymer lacks measurable or demonstrable long chain branches, that is, typically, the polymer is substituted with an average of less than 0.01 long chain branch per 1000 total carbons.

The homogeneous branched ethylene polymers useful in the present invention will preferably have a single melting peak, as measured using differential scanning calorimetry (DSC), in contrast to heterogeneously branched linear ethylene polymers, which have 2 or more melting peaks, due to the heterogeneously branched polymer's broad branching distribution.

Homogeneously branched linear ethylene interpolymers are a known class of polymers which have a linear polymer backbone, no measureable long chain branching and a narrow molecular weight distribution. Such polymers are interpolymers of ethylene and at least one α-olefin comonomer of from 3 to 20 carbon atoms, and are preferably copolymers of ethylene with a C3-C20 α-olefin, and are more preferably copolymers of ethylene with propylene, 1-butene, 1-pentene, 1-hexene, 1-heptene or 1-octene, and even more preferably, propylene, 1-butene, 1-hexene or 1-octene.

This class of polymers is disclosed for example, by Elston in U.S. Pat. No. 3,645,992, and subsequent processes to produce such polymers using metallocene catalysts have been developed, as shown, for example, in EP 0 129 368, EP 0 260 999, U.S. Pat. No. 4,701,432; U.S. Pat. No. 4,937,301; U.S. Pat. No. 4,935,397; U.S. Pat. No. 5,055,438; and WO 90/07526, and others. The polymers can be made by conventional polymerization processes (for example, gas phase, slurry, solution, and high pressure).

In one embodiment, the ethylene/α-olefin interpolymer has a molecular weight distribution ($M_w/M_n$) less than, or equal to, 10, and preferably less than, or equal to, 5. More preferably the ethylene/α-olefin polymers have a molecular weight distribution from 1.1 to 5, and more preferably from 1.5 to 4. All individual values and subranges from 1 to 5 are included herein and disclosed herein.

Comonomers include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the ethylene is copolymerized with one $C_3$-$C_{20}$ α-olefin. Preferred comonomers include propene, 1-butene, 1-pentene, 1-hexene, 1-heptene and 1-octene, and more preferably include propene, 1-butene, 1-hexene and 1-octene.

Illustrative α-olefins include propylene, 1-butene, 1-pentene, 1-hexene, 4-methyl-1-pentene, 1-heptene, 1-octene, 1-nonene and 1-decene. The α-olefin is desirably a C3-C10 α-olefin. Preferably, the α-olefin is propylene, 1-butene, 1-hexene or 1-octene. Illustrative interpolymers include ethylene/propylene (EP) copolymers, ethylene/butene (EB) copolymers, ethylene/hexene (EH) copolymers, ethylene/octene (EO) copolymers, ethylene/α-olefin/diene modified (EAODM) interpolymers, such as ethylene/propylene/diene modified (EPDM) interpolymers and ethylene/propylene/octene terpolymers. Preferred copolymers include EP. EB, EH and EO polymers.

Suitable diene and triene comonomers include 7-methyl-1,6-octadiene; 3,7-dimethyl-1,6-octadiene; 5,7-dimethyl-1,6-octadiene; 3,7,11-dimethyl-1,6,10-octatriene; 6-methyl-1,5heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-butadiene, 1,3-pentadiene, norbornadiene, and dicyclopentadiene; C8-40 vinyl aromatic compounds including sytrene, o-, m-, and p-methylstyrene, divinylbenzene, vinylbiphenyl, vinylnapthalene; and halogen-substituted C8-40 vinyl aromatic compounds such as chlorostyrene and fluorostyrene.

In another embodiment, the ethylene/α-olefin interpolymer has a melt index ($I_2$) from 0.01 g/10 min to 1000 g/10 min, preferably from 0.01 g/10 min to 500 g/10 min, and more preferably from 0.01 g/10 min to 100 g/10 min, as determined using ASTM D-1238 (190° C., 2.16 kg load). All individual values and subranges from 0.01 g/10 min to 1000 g/min are includes herein and disclosed herein.

In another embodiment, the ethylene/α-olefin interpolymer has a percent crystallinity of less than, or equal to, 60 percent, preferably less than, or equal to, 50 percent, and more preferably less than, or equal to, 40 percent, as measured by DSC. Preferably, these polymers have a percent crystallinity from 2 percent to 60 percent, including all individual values and subranges from 2 percent to 60 percent. Such individual values and subranges are disclosed herein.

In another embodiment, the ethylene/α-olefin interpolymer has a density less than, or equal to, 0.93 g/cc, preferably less than, or equal to, 0.92 g/cc, and more preferably less than, or equal to, 0.91 g/cc. In another embodiment, the ethylene/α-olefin interpolymer has a density greater than, or equal to, 0.85 g/cc, preferably greater than, or equal to, 0.86 g/cc, and more preferably greater than, or equal to, 0.87 g/cc.

In another embodiment, the ethylene/α-olefin interpolymer has a density from 0.85 g/cm³ to 0.93 g/cm³, and preferably from 0.86 g/cm³ to 0.92 g/cm³, and more preferably from 0.87 g/cm³ to 0.91 g/cm³. All individual values and subranges from 0.85 g/cm³ to 0.93 g/cm³ are included herein and disclosed herein.

In another embodiment, the final functionalized ethylene/α-olefin interpolymer, comprising an imide functionality, has a melt index ($I_2$) from 0.01 g/10 min to 1000 g/10 min, preferably from 0.01 g/10 min to 500 g/10 min, and more preferably from 0.01 g/10 min to 100 g/10 min, as determined using ASTM D-1238 (190° C., 2.16 kg load). All individual values and subranges from 0.01 g/10 min to 1000 g/10 min are includes herein and disclosed herein.

Propylene-Based Polymers May be Blended with the Olefin Multiblock Interpolymer

As discussed above, suitable propylene-based interpolymers may be mixed or blended with the olefin multiblock interpolymer used as the base polymer and then the blend may be functionalized. Suitable propylene-based interpolymers include propylene homopolymers, propylene interpolymers, as well as reactor copolymers of polypropylene (RCPP), which can contain about 1 to about 20 wt % ethylene or an α-olefin comonomer of 4 to 20 carbon atoms. The polypropylene homopolymer can be isotactic, syndiotactic or atactic polypropylene. The propylene interpolymer can be a random or block copolymer, or a propylene-based terpolymer.

The propylene polymer may be crystalline, semi-crystalline or amorphous. A crystalline polypropylene polymer typically has at least 90 mole percent of its repeating units derived from propylene, preferably at least 97 percent, more preferably at least 99 percent.

Suitable comonomers for polymerizing with propylene include ethylene, 1-butene, 1-pentene, 1-hexene, 1-heptene, 1-octene, 1-nonene, 1-decene, 1-unidecene, 1dodecene, as well as 4-methyl-1-pentene, 4-methyl-1-hexene, 5-methyl-1-hexene, vinylcyclohexane, and styrene. The preferred comonomers include ethylene, 1-butene, 1-hexene, and 1-octene, and more preferably ethylene.

Optionally, the propylene-based polymer comprises monomers having at least two double bonds which are preferably dienes or trienes. Suitable diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-butadiene, 1,3-pentadiene, norbornadiene, and dicyclopentadiene; C8-40 vinyl aromatic compounds including sytrene, o-, m-, and p-methylstyrene, divinylbenzene, vinylbiphenyl, vinylnapthalene; and halogen-substituted C8-40 vinyl aromatic compounds such as chlorostyrene and fluorostyrene.

The propylene copolymers of particular interest include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

Suitable polypropylenes are formed by means within the skill in the art, for example, using single site catalysts (metallocene or constrained geometry) or Ziegler Natta catalysts. The propylene and optional comonomers, such as ethylene or alpha-olefin monomers are polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98. Polypropylene polymers include Shell's KF 6100 homopolymer polypropylene; Solvay's KS 4005 polypropylene copolymer; Solvay's KS 300 polypropylene terpolymer; and INSPIRE$^M$ polypropylene resins available from The Dow Chemical Company.

Preferably, the propylene-based polymer has a melt flow rate (MFR) in the range of 0.01 to 1000 g/10 min, more preferably in range of 0.1 to 500 g/10 min, and more preferably 1 to 100 g/10 min, as measured in accordance with ASTM D 1238 at 230° C./2.16 kg.

The propylene-based polymer used in the present invention may be of any molecular weight distribution (MWD). Propylene-based polymers of broad or narrow MWD are formed by means within the skill in the art. Propylene-based polymers having a narrow MWD can be advantageously provided by visbreaking or by manufacturing reactor grades (non visbroken) using single-site catalysis, or by both methods.

The propylene-based polymer can be reactor-grade, visbroken, branched or coupled to provide increased nucleation and crystallization rates. The term "coupled" is used herein to refer to propylene-based polymers which are rheology-modified, such that they exhibit a change in the resistance of the molten polymer to flow during extrusion (for example, in the extruder immediately prior to the annular die). Whereas "visbroken" is in the direction of chain-scission, "coupled" is in the direction of crosslinking or networking. As an example of coupling, a couple agent (for example, an azide compound) is added to a relatively high melt flow rate polypropylene polymer, such that after extrusion, the resultant polypropylene polymer composition attains a substantially lower melt flow rate than the initial melt flow rate. Preferably, for coupled or branched polypropylene, the ratio of subsequent MFR to initial MFR is less than, or equal, to 0.7:1, more preferably less than or equal to 0.2:1.

A suitable branched propylene-based polymers for use in the present invention are commercially available, for instance from Montell North America, under the trade designations Profax PF-611 and PF-814. Alternatively, suitable branched or coupled propylene-based polymers can be prepared by means, within the skill in the art, such as by peroxide or electron-beam treatment, for instance as disclosed by DeNicola et al. in U.S. Pat. No. 5,414,027 (the use of high energy (ionizing) radiation in a reduced oxygen atmosphere); EP 0 190 889 to Himont (electron beam irradiation of isotactic polypropylene at lower temperatures); U.S. Pat. No. 5,464,907 (Akzo Nobel NV); EP 0 754 711 Solvay (peroxide treatment); and U.S. patent application Ser. No. 09/133,576, filed Aug. 13, 1998 (azide coupling agents). Each of these patents/applications is incorporated herein by reference.

Suitable propylene/α-olefin interpolymers, comprising at least 50 mol % polymerized propylene, fall within the invention. Suitable polypropylene base polymers include VERSIFY™ polymers (The Dow Chemical Company) and VISTAMAXX™ polymers (ExxonMobil Chemical Co.), LICOCENE™ polymers (Clariant), EASTOFLEX™ polymers (Eastman Chemical Co.), REXTAC™ polymers (Hunstman), and VESTOPLAST™ polymers (Degussa). Other suitable polymers include propylene-α-olefins block copolymers and interpolymers, and other propylene based block copolymers and interpolymers known in the art.

Preferred comonomers include, but are not limited to ethylene, isobutylene, 1-butene, 1-pentene, 1-hexene, 3-methyl-1-pentene, 4-methyl-1-pentene, 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the comonomer is an ethylene or a $C_4$-$C_{20}$ α-olefin. Preferred comonomers include ethylene, 1-butene, 1-pentene, 1-hexene, 1-heptene and 1-octene, and more preferably include ethylene, 1-butene, 1-hexene and 1-octene.

In another embodiment, the propylene-based polymer is a propylene/α-olefin interpolymer, which has a molecular weight distribution less than, or equal to, 5, and preferably less than, or equal to, 4, and more preferably less than, or equal to 3. More preferably the propylene/α-olefin interpolymer has a molecular weight distribution from 1.1 to 5, and more preferably from about 1.5 to 4.5, and more preferably from about 2 to 4. In another embodiment, the molecular weight distribution is less than about 3.5, preferably less than about 3.0, more preferably less than about 2.8, more preferably less than about 2.5, and most preferably less than about 2.3. All individual values and subranges from about 1 to 5 are included herein and disclosed herein.

In another embodiment, the propylene/α-olefin interpolymer has a melt flow rate (MFR) less than, or equal to 1000 g/10 min, preferably less than, or equal to 500 g/10 min, and more preferably less than, or equal to 100 g/10 min, and even more preferably less than, or equal to 50 g/10 min, as measured in accordance with ASTM D 1238 at 230° C./2.16 kg. In another embodiment, propylene/α-olefin interpolymer has a melt flow rate (MFR) greater than, or equal to 0.01 g/10 min, preferably greater than, or equal to 0.1 g/10 min, and more preferably greater than, or equal to 1 g/10 min, as measured in accordance with ASTM D 1238 at 230° C./2.16 kg.

In another embodiment, the propylene/α-olefin interpolymer has a melt flow rate (MFR) in the range of 0.01 to 1000 grams/10 minutes, more preferably in range of 0.01 to 500 grams/10 minutes, more preferably from 0.1 to 100 grams/10 min, and even more preferably from 0.1 to 50 grams/10 min, as measured in accordance with ASTM D 1238 at 230° C./2.16 kg. All individual values and subranges from 0.01 to 1000 grams/10 min are included herein and disclosed herein.

In another embodiment, the propylene/α-olefin interpolymer has a percent crystallinity of less than, or equal to, 50 percent, preferably less than, or equal to, 40 percent, and more preferably less than, or equal to, 35 percent, as measured by DSC. Preferably, these polymers have a percent crystallinity from 2 percent to 50 percent, including all individual values and subranges from 2 percent to 50 percent. Such individual values and subranges are disclosed herein.

In another embodiment, the propylene/α-olefin interpolymer has a density less than, or equal to, 0.90 g/cc, preferably less than, or equal to, 0.89 g/cc, and more preferably less than, or equal to, 0.88 g/cc. In another embodiment, the propylene/α-olefin interpolymer has a density greater than, or equal to, 0.83 g/cc, preferably greater than, or equal to, 0.84 g/cc, and more preferably greater than, or equal to, 0.85 glee.

In another embodiment, the propylene/α-olefin interpolymer has a density from 0.83 g/cm$^3$ to 0.90 g/cm$^3$, and preferably from 0.84 g/cm$^3$ to 0.89 g/cm$^3$, and more preferably from 0.85 g/cm$^3$ to 0.88 g/cm$^3$. All individual values and subranges from 0.83 g/cm$^3$ to 0.90 g/cm$^3$, are included herein and disclosed herein.

In another embodiment, the propylene-based polymer is a propylene/ethylene interpolymer, which has a molecular weight distribution less than, or equal to, 5, and preferably less than, or equal to, 4, and more preferably less than, or equal to 3. More preferably the propylene/ethylene interpolymer has a molecular weight distribution from 1.1 to 5, and more preferably from 1.5 to 4.5, and more preferably from 2 to 4. In another embodiment, the molecular weight distribution is less than about 3.5, preferably less than about 3.0, more preferably less than about 2.8, more preferably less than about 2.5, and most preferably less than about 2.3. All individual values and subranges from about 1 to 5 are included herein and disclosed herein.

In another embodiment, the propylene/ethylene interpolymer has a melt flow rate (MFR) less than, or equal to 1000 g/10 min, preferably less than, or equal to 500 g/10 min, and more preferably less than, or equal to 100 g/10 min, and even more preferably less than, or equal to 50 g/10 min, as measured in accordance with ASTM D 1238 at 230° C./2.16 kg. In another embodiment, propylene/ethylene interpolymer has a melt flow rate (MFR) greater than, or equal to 0.01 g/10 min, preferably greater than, or equal to 0.1 g/10 min, and more preferably greater than, or equal to 1 g/10 min, as measured in accordance with ASTM D 1238 at 230° C./2.16 kg.

In another embodiment, the propylene/ethylene interpolymer has a melt flow rate (MFR) in the range of 0.01 to 1000 grams/10 minutes, more preferably in range of 0.01 to 500 grams/10 minutes, more preferably from 0.1 to 100 grams/10 min, and even more preferably from 0.1 to 50 grams/10 min, as measured in accordance with ASTM D 1238 at 230° C./2.16 kg. All individual values and subranges from 0.01 to 1000 grams/10 min are included herein and disclosed herein.

In another embodiment, the propylene ethylene interpolymer has a percent crystallinity of less than, or equal to, 50 percent, preferably less than, or equal to, 40 percent, and more preferably less than, or equal to, 35 percent, as measured by DSC. Preferably, these polymers have a percent crystallinity from 2 percent to 50 percent, including all individual values and subranges from 2 percent to 50 percent. Such individual values and subranges are disclosed herein.

In another embodiment, the propylene/ethylene interpolymer has a density less than, or equal to, 0.90 g/cc, preferably less than, or equal to, 0.89 g/cc, and more preferably less than, or equal to, 0.88 g/cc. In another embodiment, the propylene/α-olefin interpolymer has a density greater than, or equal to, 0.83 g/cc, preferably greater than, or equal to, 0.84 g/cc, and more preferably greater than, or equal to, 0.85 glee.

In another embodiment, the propylene/ethylene interpolymer has a density from 0.83 g/cm$^3$ to 0.90 g/cm$^3$, and preferably from 0.84 g/cm$^3$ to 0.89 g/cm$^3$, and more preferably from 0.85 g/cm$^3$ to 0.88 g/cm$^3$. All individual values and subranges from 0.83 g/cm$^3$ to 0.90 g/cm$^3$, are included herein and disclosed herein.

The propylene copolymers of this invention typically comprise units derived from propylene in an amount of at least about 60, preferably at least about 80 and more preferably at least about 85, weight percent of the copolymer. The typical amount of units derived from ethylene in propylene/ethylene copolymers is at least about 0.1, preferably at least about 1 and more preferably at least about 5 weight percent, and the maximum amount of units derived from ethylene present in these copolymers is typically not in excess of about 35, preferably not in excess of about 30 and more preferably not in excess of about 20, weight percent of the copolymer. The amount of units derived from the unsaturated comonomer(s), if present, is typically at least about 0.01, preferably at least about 1 and more preferably at least about 5, weight percent, and the typical maximum amount of units derived from the unsaturated comonomer(s) typically does not exceed about 35, preferably it does not exceed about 30 and more preferably it does not exceed about 20, weight percent of the copolymer. The combined total of units derived from ethylene and any unsaturated comonomer typically does not exceed about 40, preferably it does not exceed about 30 and more preferably it does not exceed about 20, weight percent of the copolymer.

The copolymers of this invention comprising propylene and one or more unsaturated comonomers, other than ethylene, also typically comprise units derived from propylene in an amount of at least about 60, preferably at least about 70 and more preferably at least about 80, weight percent of the copolymer. The one or more unsaturated comonomers of the copolymer comprise at least about 0.1, preferably at least about 1 and more preferably at least about 3, weight percent, and the typical maximum amount of unsaturated comonomer does not exceed about 40, and preferably it does not exceed about 30, weight percent of the copolymer.

In a preferred embodiment, these propylene-based polymers are made using a metal-centered, heteroaryl ligand catalyst in combination with one or more activators, e.g., an alumoxane. In certain embodiments, the metal is one or more of hafnium and zirconium. More specifically, in certain embodiments of the catalyst, the use of a hafnium metal has been found to be preferred as compared to a zirconium metal for heteroaryl ligand catalysts. The catalysts in certain embodiments are compositions comprising the ligand and metal precursor, and, optionally, may additionally include an activator, combination of activators or activator package.

The catalysts used to make the propylene-based polymers additionally include catalysts comprising ancillary ligand-hafnium complexes, ancillary ligand-zirconium complexes and optionally activators, which catalyze polymerization and copolymerization reactions, particularly with monomers that are olefins, diolefins or other unsaturated compounds. Zirconium complexes, hafnium complexes, compositions can be used. The metal-ligand complexes may be in a neutral or charged state. The ligand to metal ratio may also vary, the exact ratio being dependent on the nature of the ligand and metal-ligand complex. The metal-ligand complex or complexes may take different forms, for example, they may be monomeric, dimeric, or of an even higher order. Suitable catalyst structures and associated ligands are described in U.S. Pat. No. 6,919,407, column 16, line 6 to column 41, line 23, which is incorporated herein by reference. In a further embodiment, the propylene-based polymer comprises at least 50 weight percent propylene (based on the total amount of polymerizable monomers) and at least 5 weight percent ethylene (based on the total amount of polymerizable monomer), and has $^{13}$C NMR peaks, corresponding to a region error, at about 14.6 and 15.7 ppm, and the peaks are of about equal intensity (for example, see U.S. Pat. No. 6,919,407, column 12, line 64 to column 15, line 51).

The propylene-based polymers can be made by any convenient process. In one embodiment, the process reagents, i.e., (i) propylene. (ii) ethylene and/or one or more unsaturated comonomers, (iii) catalyst, and, (iv) optionally, solvent and/or a molecular weight regulator (e.g., hydrogen), are fed to a single reaction vessel of any suitable design, for example, stirred tank, loop, or fluidized-bed. The process reagents are contacted within the reaction vessel under appropriate conditions (e.g., solution, slurry, gas phase, suspension, high pressure) to form the desired polymer, and then the output of the reactor is recovered for post-reaction processing. All of the output from the reactor can be recovered at one time (as in the case of a single pass or batch reactor), or it can be recovered in the form of a bleed stream, which forms only a part, typically a minor part, of the reaction mass (as in the case of a continuous process reactor, in which an output stream is bled from the reactor, at the same rate at which reagents are added to maintain the polymerization at steady-state conditions). "Reaction mass" means the contents within a reactor, typically during, or subsequent to, polymerization. The reaction mass includes reactants, solvent (if any), catalyst, and products and by-products. The recovered solvent and unreacted monomers can be recycled back to the reaction vessel. Suitable polymerization conditions are described in U.S. Pat. No. 6,919,407, column 41, line 23 to column 45, line 43, incorporated herein by reference.

Preferably, the functionalized propylene-based polymer, comprising an imide functionality, has a melt flow rate (MFR) in the range of 0.01 to 1000 g/10 min, more preferably in range of 0.1 to 500 g/10 min, and more preferably 1 to 100 g/10 min, as measured in accordance with ASTM D 1238 at 230° C./2.16 kg.

Additional Reactions and/or Blends

The amine functionalized olefin multiblock interpolymer or hydroxyl functionalized olefin multiblock interpolymer, each according to the invention, may be reacted or blended with a second polymer by melt reaction, for example, in a Brabender mixer or an extruder. This may be conducted in the same reactor as the functionalization reaction, or subsequently, in another melt reactor. The reaction time and temperature will depend on the polymers present. Thus, for example, amino functionalized polypropylene (amino-PP) may be melt reacted/blended with a blend of styrene-maleic acid polymer in polypropylene.

Similarly, polyolefin blends comprising a polyolefin, an aminated polyolefin and other polymer, such as an engineering thermoplastic that is reactive with, or otherwise compatible with, the aminated olefin multiblock interpolymer, can be prepared having improved overall blend compatibility between the polyolefin, other polymer, and aminated olefin multiblock interpolymer. In addition, the functionalized olefin multiblock interpolymers or blends can be blended with one or more thermoplastic or thermosetting polymers, and used in other applications.

Thermoplastic polymers include the natural or synthetic resins, such as, for example, styrene block copolymers, rubbers, linear low density polyethylene (LLDPE), high density polyethylene (HDPE), low density polyethylene (LDPE), ethylene/vinyl acetate (EVA) copolymer, ethylene-carboxylic acid copolymers (EAA), ethylene acrylate copolymers, polybutylene, polybutadiene, nylons, polycarbonates, polyesters, polypropylene, ethylene-propylene interpolymers such as ethylene-propylene rubber, ethylene-propylene-diene monomer rubbers, chlorinated polyethylene, thermoplastic vulcanates, ethylene ethylacrylate polymers (EEA), ethylene styrene interpolymers (ESI), polyurethanes, as well as graft-modified olefin polymers, and combinations of two or more of these polymers.

The blend compositions of the present invention can be used in a variety of applications including thermoforming, blow molding, injection molding and overmolding, calendering, fiber forming processes, wire and cable, extrusion coatings and dispersions.

Processing aids, such as plasticizers, can also be included in either the individual blend components or added to the final blend. These include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as Kaydol™ oil (available from and a registered trademark of Witco) and Shellflex™ 371 naphthenic oil (available from and a registered trademark of Shell Oil Company). Another suitable oil is Tuflo™ oil (available from and a registered trademark of Lyondell).

Additives

Typically polymers and resins used in the invention are treated with one or more stabilizers, for example, antioxidants, such as Irganox™ 1010 and Irgafos™ 168, both supplied by Ciba Specialty Chemicals. Polymers are typically treated with one or more stabilizers before an extrusion or other melt processes. Other polymeric additives include, but are not limited to, ultraviolet light absorbers, antistatic agents, pigments, dyes, nucleating agents, fillers slip agents, fire retardants, plasticizers, processing aids, lubricants, stabilizers, smoke inhibitors, viscosity control agents and anti-blocking agents.

Applications

The functionalized olefin multiblock interpolymers of the invention can be used in various applications, including, but not limited to adhesives to polymer substrates and foams, for example adhesives to polyurethane films and foams, and adhesives to polyesters; dyes, paint adhesives and paint adhesion enablers; weldability applications; automotive interiors and exteriors; lubricants and engine oil components; fibers; fabrics; compatibilizers for polymer compositions; toughening agents for polymer compositions; conveyor belts; films; adhesives; footwear components; artificial leather; injection molded objects, such as injection molded toys; roofing and construction materials; dispersions; carpet components, such as carpet backings; and artificial turf.

In particular, the inventive functionalized olefin multiblock interpolymers can be used in the following applications: (a) outsoles, midsoles and stiffners, to be assembled with standard polyurethane adhesive systems currently used by footwear industry, (b) painting of soles and mid-soles with polyurethane paints, currently used by footwear industry, and (c) over-molding of olefin multiblock interpolymers and bi-component polyurethanes for multilayered soles and midsoles. In addition, polyolefin/polyurethane blends can be used in other applications, such as automotive applications and construction applications. Automotive applications include, but are not limited to, the manufacture of bumper fascias, vertical panels, soft TPO skins, interior trim. Construction applications include, but are not limited to the manufacture of furniture and toys.

Additional applications include adhesion of co-extruded films, where one or more substrates are compatible or reactive with hydroxyl groups, and the lamination of polyolefin based films to other polar substrates (for example, glass lamination). Further applications include artificial leather to be adhered to polar substrates, such as polyurethane, polyvinyl chloride (PVC), and others. Artificial leather is used for automotive interiors adhering to polyurethane for seating, head liners.

The functionalized olefin multiblock interpolymers are also suitable for Health & Hygiene products, such as wipes, cleaning tissues, foams or directly dyable fibers. The functionalized olefin multiblock interpolymers can be used to enhance hydrophilicity of the elastomer for novel membrane structures for separation or breathability. The functionalized olefin multiblock interpolymers are also suitable for use as self-adhearable elastomers onto metal or textile structures for automotive. As discussed above, the functionalized olefin multiblock interpolymers are well suited for blends and compatibilizers with enhanced interaction towards polar polymers, such as TPU, EVA, PVC, PC, PET, PLA (polylactic acid), polyamide esters, and PBT. Such bends can be used for novel compounds for footwear, automotive, consumer, durables, appliances, electronic housing, apparel, and conveyor belts. The functionalized olefin multiblock interpolymers can also serve as compatibilizers between natural fibers and other polyolefins for use in applications, such as wood binding formulations or cellulose binding formulations. The functionalized olefin multiblock interpolymers of the invention are also useful in blends with one or more polyether block amides, such as Pebax® polymers available from Arkema. The functionalized olefin multiblock interpolymers may also be used as impact modifiers for nylon. In addition, amine groups of the inventive functionalized olefin multiblock interpolymers may be protonated or alkylated to form quartnary nitrogens or ionomers for use as anti-microbials.

The functionalized olefin multiblock interpolymers can also be used to enhance the interaction to fillers, such as silica, carbon black or clay, for use in formulations for toners, tires, coatings or other compounds. The functionalized olefin multiblock interpolymers may also be used in engine oil viscosity modifiers, engine oil dispersants, dyable or printable fibers for apparel, paint adhesion promoters, adhesives for glass, metal and PVDC barrier resins, dispersions, components in primers and sizing agents.

Thus the invention also provides a painted substrate, the substrate formed from an inventive composition as described herein, and the paint comprising at least one of an acrylic polymer, alkyd resin, cellulose-based material, melamine resin, urethane resin, carbamate resin, polyester resin, vinyl acetate resin, polyol and alcohols. In a further embodiment, the paint is a water-based. In another embodiment, the paint is an organic solvent based.

This embodiment of the invention works well with a wide variety of paint formulations. The major components of solvent-borne paints and coatings are solvents, binders, pigments, and additives. In paint, the combination of the binder and solvent is referred to as the paint vehicle. Pigment and additives are dispersed within the vehicle. The amount of each constituent varies with the particular paint, but solvents traditionally make up about 60 percent of the total formulation. Typical solvents include toluene, xylene, methyl ethyl ketone, methyl isobutyl ketone and water. Binders account for about 30 weight percent, pigments for 7 to 8 weight percent, and additives for 2 to 3 weight percent. Some of the polymers and other additives used in paint formulations include: acrylic polymers, alkyd resins, cellulose based materials, such as cellulose acetate butyrate, melamine resins, carbamate resins, polyester resins, vinyl acetate resins, urethane resins, polyols, alcohols, inorganic materials such as titanium dioxide (rutile), mica flakes, iron oxide, silica, aluminum, and the like.

The invention also provides an over-molded article, the article formed from a polar substrate and a molded overlay formed from an inventive composition, as described herein.

In another embodiment, the invention provides an over-molded article, the article formed from a substrate comprising an inventive composition, as described herein, and a molded overlay comprising a polar material. In further embodiment, the article is in the form of a grip, handle or belt.

The invention also provides a laminated structure comprising a first layer and a second layer, the first layer formed from an inventive composition, as described herein, and the second layer formed from a composition comprising a polar material. In a further embodiment, one of the layers is in the form of a foam. In another embodiment, one of the layers is in the form of a fabric. In a further embodiment, the laminated structure is in the form of an awning, tarp or automobile skin or steering wheel.

The invention also provides a molded article comprising a first component and a second component, the first component is formed from a polar material, and the second component formed from an inventive composition, as described herein. In a further embodiment, the article is in the form of an automobile skin, appliqué, footwear, conveyor belt, timing belt or consumer durable.

The invention also provides an article comprising at least one component formed from an inventive composition, as described herein. In a further embodiment, the article is a carpet, an adhesive, a wire sheath, a cable, a protective apparel, a coating or a foam laminate. In another embodiment, the article is a tie layer between extruded sheets, films or profiles; a tie layer between cast sheets, films or profiles; an automotive skin; an awning; a tarp; a roofing construe on article (for example, adhesives to epoxy, urethane or acrylic-based substrates for all roofing applications, such as insulation bonding, liquid roofing, façade sealant, expansion joints, wet-room sealants, pitched roof, acrylics-adhered roof, bitumen bonding, and PUR-adhered refurbishment); a steering wheel; a powder coating; a powder slush molding; a consumer durable; a grip; a handle; a computer component; a belt; an appliqués, a footwear component, adhesive a conveyor or timing belt, or a fabric.

"Laminates", "laminations" and like terms mean two or more layers, for example, film layers, in intimate contact with one another. Laminates include molded articles bearing a coating. Laminates are not blends, although one or more layers of a laminate may comprise a blend.

"Polar", "polar polymer" and like terms mean that the polymer molecules have a permanent dipole, i.e., the polymer molecule has a positive end and a negative end. In other words, the electrons in a polar molecule are not shared equally among the atoms of the molecule. In contrast, "nonpolar", "nonpolar polymer" and like terms mean that the polymer molecules do not have a permanent dipole, i.e., the polymer does not have a positive end and a negative end. The electrons in a nonpolar molecule are essentially equally shared among the atoms of the molecule. Most hydrocarbon liquids and polymers are nonpolar.

Polymers substituted with carboxyl, hydroxyl and the like are often polar polymers. Articles prepared from nonpolar polymers have relatively low surface energy, that is, less than about 32 dyne per centimeter (dyne/cm), and articles prepared from polar polymers have relatively high surface energy, that is, 32 or more dyne/cm. The nonpolar material of this invention typically comprises one or more nonpolar thermoplastic olefinic polymers, typically elastomers, free of any significant amount of polar functionality, for example, hydroxyl, carboxyl, carbonyl, ester, ether, amide, mercaptan, halide and the like groups. The polar material of this invention typically comprises one or more polymers comprising one or more polar functionalities. Typical polymers comprising one more polar functionalities include, but are not limited to, polyesters, polyethers, polylactic acid, polycarbonates, nylons, polysulfides, polysulfones, polyurethanes, polyvinyl alcohol, poly(vinyl acetate), poly(vinyl chloride), acrylonitrile. ABS, polyimide esters, and polysiloxanes.

"Insignificant amount of polar functionality," and like terms, mean that a polymer does not comprise a sufficient number of polar functional groups to impart a surface energy of at least about 32 dyne/cm to an article, made from it.

"Over-molding," and like terms, refer to a process in which one resin is injection into a mold comprising a pre-placed substrate, and molded over this substrate. Over-molding is typically used to improve the performance and properties of a final product by over-molding one resin over another polymer substrate. Over-molding can be used to form seamless, integrated parts. Examples of over-molded parts include flexible grip handles on power tools and kitchen utensils, which provide additional gripping properties, without the hygienic concern normally associated with mechanical assemblies. The substrate may be any suitable material, such as a plastic, metal or ceramic part.

"Molded overlay," and like terms, refer to an article comprising at least two parts (an injection molded part and a substrate) that are bound together. The injection molded part is placed on top of the substrate, outside the injection mold. An adhesive may be used to bind the injection molded part to the substrate. The substrate may be any suitable material, such as a plastic, metal or ceramic part.

The substrates to which the inventive functionalized olefin multiblock interpolymers, and compositions comprising the same, can be applied, include a wide range of materials, both polar and nonpolar, such as but not limited to, polymers, metal, wood, concrete, glass, ceramic, and various composites of two or more of these materials. Alternatively, these materials can be applied to an article formed from an inventive functionalized olefin multiblock interpolymers, and compositions comprising the same.

Application methods include painting, printing, dying, over-molding and the like, including the many variations on each, for example, spreading, spraying, dipping, extrusion, and other processes. The functionalized olefin multiblock interpolymers, and compositions comprising the same, can be crosslinked before, during or after application to a substrate, and they can be crosslinked in any convenient manner, for example, peroxide, sulfur, moisture, silane, radiation, heat and the like. In one embodiment, the functionalized olefin multiblock interpolymers, and compositions comprising the same, is applied to a substrate, and the functionalized olefin multiblock interpolymers is crosslinked, as it is applied, and/or after it is applied. For crosslinking, the functionalized olefin multiblock interpolymers will usually contain unsaturation, e.g., a diene-containing PO.

In one embodiment, the inventive functionalized olefin multiblock interpolymers, and compositions comprising the same, can be used to form a tie layer between polar and nonpolar materials, particularly between polar and nonpolar polymeric materials, for example, between a film layer of a nonpolar-PO, such as polyethylene or polypropylene, and a film layer of a polar polymer such as polylactic acid (PLA) or polyamide or polyester. The functionalized olefin multiblock interpolymers of this invention are particularly well suited as tie layers for binding together a) a polyethylene or polypropylene film, or a polyethylene or polypropylene surface of a molded article, to b) a film, or surface of a molded article, of an ethylene/acrylic acid copolymer (EAA) or a copolymer of PLA or polyethylene terephthalate (PET). Any processes that combine co-extrusion, extrusion lamination, adhesive lamination, and/or foam casting or extrusion can be used to create these laminated structures, including structures in which one layer comprises a foam.

In another embodiment, the invention provides a laminate structure comprising a polycarbonate, as the base sheet having variable thickness, and preferably having at least one textured surface on which a functionalized olefin multiblock interpolymer of the invention can be adhered, typically by a compression molding process at moderate temperatures of 140° C. Such laminates have been shown to have excellent adhesion; for example a peel strength of 1N/mm in the case of an olefin multiblock interpolymer functionalized with secondary amine groups at a concentration of 1.1 weight percent. This article can be further laminated with polyolefin using conventional welding techniques, for example, by pressure and heat. In addition, a second polycarbonate sheet with a textured surface interfacing the functionalized olefin multiblock interpolymer film can be laminated over the functionalized olefin multiblock interpolymer.

In another embodiment, the invention provides an over molded article comprising a polycarbonate, as the base sheet having variable thickness, and preferably having at least textured face on which functionalized olefin multiblock interpolymer can be adhered, typically by a compression molding process, at a moderate temperatures of 140° C. Such articles have excellent adhesion. This article can be further laminated with polyolefin using conventional welding techniques, such as by pressure and heat, or a second polycarbonate sheet with a textured surface can be adhered to the exposed surface of the functionalized olefin multiblock interpolymer film.

Another embodiment of this invention is a multi-laminate structure of polycarbonate and polyolefin films, intercalated for increased toughness of the final structure. Another embodiment would be a functionalized olefin multiblock interpolymer elastomeric coating deposited on the surface of polycarbonate to provide a scratch resistant assembly coat that could be easily thermoformed, for example at a thermoforming temperature of 160° C.

The invention also provides a footwear article comprising at least one component formed from a composition comprising a functionalized olefin multiblock interpolymer. In one embodiment, the article is selected from the group consisting of shoe outsole, shoe midsole, shoe unitsole, an overmolded article, a natural leather article, a synthetic leather article, an upper, a laminated article, a coated article, a boot, a sandal, galoshes, a plastic shoe, and combinations thereof.

The functionalized olefin multiblock interpolymers may also be used in dispersions, including, but not limited to, water-based dispersions for use as primers in olefinic footwear that promote adhesion to PU glues and leather; fabric coating adhesion (adhesion to PET, Nylon, PP, elastomer rich TPO comprising of POE, EPDM or other non-polar elastomers or combination thereof etc.).

Definitions

Any numerical range recited herein, includes all values from the lower value to the upper value, in increments of one unit, provided that there is a separation of at least two units between any lower value and any higher value. As an example, if it is stated that a compositional, physical or mechanical property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (for example, 1.1, 1.5, etc.), one unit is considered to be 0.0001, 0.001, 0.01 or 0.1, as appropriate. For ranges containing numbers less than ten (for example, 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to melt index, molecular weight distribution, percent crystallinity, density and other properties.

The term "composition," as used herein, includes a mixture of materials which comprise the composition, as well as reaction products and decomposition products formed from the materials of the composition.

The terms "blend" or "polymer blend," or "mixture" as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The term, "ethylene-based polymer," as used herein, refers to a polymer that comprises more than 50 mole percent polymerized ethylene monomer (based on the total amount of polymerizable monomers), and optionally may contain at least one comonomer. These are not typically referred to as olefin multiblock polymers.

The term, "propylene-based polymer," as used herein, refers to a polymer that comprises more than 50 mole percent polymerized propylene monomer (based on the total amount of polymerizable monomers), and optionally may contain at least one comonomer. These are not typically referred to as olefin multiblock polymers.

The term, "propylene/α-olefin interpolymer," as used herein, refers to an interpolymer that contains more than 50 mole percent polymerized propylene monomer (based on the total amount of polymerizable monomers), and at least one α-olefin.

The term, "propylene/ethylene interpolymer," as used herein, refers to an interpolymer that comprises more than 50 mole percent polymerized propylene monomer (based on the total amount of polymerizable monomers), ethylene monomer, and, optionally, at least one α-olefin.

The term "amine-reactive group," as used herein, refers to a chemical group or chemical moiety that can react with an amine group.

The term "hydroxyl-reactive group," or "hydroxy-reactive group," as used herein, refers to a chemical group or chemical moiety that can react with a hydroxy group.

The term "imbibing," and similar terms, as used herein, refers to the process in which a compound is absorbed into a polymer solid, particle, pellet, or article.

The term "nonpolar" polymer, as used herein, refers to a polymer that does not contain polar moieties, including, but not limited to, hydroxyl group, carbonyl group, ester group, amine group, amino group, amide group, imide group, cyano group, thiol group, and carboylic acid group. Examples of nonpolar polymers include polyolefin polymers.

The term "polar" polymer, as used herein, refers to a polymer that contains one or more polar moieties, including, but not limited to, hydroxyl group, carbonyl group, ester group, amine group, amino group, amide group, imide group, cyano group, thiol group, and carboylic acid group. Examples of polar polymers include polyesters, polyamides, polyimides, polyacrylic acids, polyethers, polyether block amides, polyetheramides, polyetherimides, polycarbonates, polyphenyleneoxides, polyvinylalcohols, polylactic acids, polyamide esters and polyvinylchlorides.

Testing Methods

In examples the following analytical techniques are employed:

CPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C. and the nitrogen flow rate set to 1.8 SLM at a pressure of 60-80 psi (400-600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b. PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)):
$M_{polyethylene}=0.431(M_{polystyrene})$.

Polyethylene equivalent molecular weight calculations are performed using Viscotek TriSEC software Version 10.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM. D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min⁻¹ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min⁻¹. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min⁻¹ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg for polyethylene-based polymers (Condition 230C/2.16 kg for polypropylene-based polymers). Melt index, or $I_{10}$ is also sometimes measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde. L.; Ryle. T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C. then slow cooled to 20° C. at 0.04° C. per minute and held for one hour. Fresh TCB is introduced at about 65 n while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)immino)methyl)(2-oxoyl) zirconium dibenzyl A solution of (1-methylethyl)(2-hydroxy-3,5-di(t-butyl) phenyl)imine (605 mg, 2.2 mmol) in 5 mL toluene is slowly added to a solution of Zr(CH$_2$Ph)$_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl)(2-oxoyl-3,5-di(t-butyl)phenyl) immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of Zr(CH$_2$Ph)$_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi(C$_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B(C$_6$F$_5$)$_4$], substantially as disclosed in U.S. Pat. No. 5,919,9883, Ex. 2.

Cocatalyst 2 Mixed C$_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis(t-butyldimethylsiloxide) (SA14), ethylaluminum di(bis(trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide(SA18), ethylzinc (2,6-diphenylphenoxide) (SA19), and ethylzinc (t-butoxide) (SA20).

Examples 1-4, Comparative A-C

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]C$_6$ or higher chain content per 1000 carbons
[2]Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 μg. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7. The corresponding CRYSTAF curve shows the tallest peak at 30° C. with a peak area of 18.2 percent. The difference between the DSC Tm and the Tcrystaf is 74.5° C.

The DSC curve for comparative A shows a 90.0° C. melting point (Tm) with a heat of fusion of 86.7 μg. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for comparative B shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for comparative C shows a 125.3° C. melting point (Tm) with a heat of fusion of 143.0 kg. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

Examples 5-19, Comparatives D-F, Continuous Solution Polymerization, Catalyst A1/B2+DEZ Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T ° C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]/[DEZ]$[4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 161.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1] standard cm³/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dibenzyl
[4] molar ratio in reactor
[5] polymer production rate
[6] percent ethylene conversion in reactor
[7] efficiency, kg polymer/g M where g M = g Hf + g Zr

TABLE 3

Properties of exemplary polymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (° C.) | $T_c$ (° C.) | $T_{CRYSTAF}$ (° C.) | $T_m - T_{CRYSTAF}$ (° C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 90 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 μg. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 μg. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 μg. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 μg. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 μg. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 μg. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 μg. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4, J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 μg. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 μg. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 μg. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 μg. The corresponding CRYSTAF curve shows the tallest peak at 79.9° C. with a peak area of 87.9 percent. The delta between the DSC Tm and the Tcrystaf is 45.0° C.

The DSC curve for the polymer of comparative D shows a peak with a 37.3° C. melting point (Tm) with a heat of fusion of 31.6 µg. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of comparative E shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of comparative F shows a peak with a 124.8° C. melting point (Tm) with a heat of fusion of 90.4 µg. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G' (25° C.)/G' (100° C.). Several commercially available polymers are included in the tests: Comparative G* is a substantially linear ethylene/1-octene copolymer (AFFINITY®, available from The Dow Chemical Company), Comparative H* is an elastomeric, substantially linear ethylene/1-octene copolymer (AFFINITY®EG8100, available from The Dow Chemical Company), Comparative I is a substantially linear ethylene/1-octene copolymer (AFFINITY®PL1840, available from The Dow Chemical Company), Comparative J is a hydrogenated styrene/butadiene/styrene triblock copolymer (KRATON™ G1652, available from KRATON Polymers), Comparative K is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft² (kPa) | G'(25° C.)/ G'(100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm. TMA temperature of greater than 90° C. or even greater than 100° C. This shows that the novel polymers have better dimensional stability at higher temperatures compared to a physical blend. Comparative J (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G' (25° C.)/G' (100° C.), for the inventive polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparatives F, G, H and J all have a 70° C. compression set of 100 percent (the maximum possible value, indicating no recovery). Good high temperature compression set (low numerical values) is especially needed for applications such as gaskets, window profiles, O-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm³) | Tensile Notched Tear Strength (mJ) |
|---|---|---|---|---|---|---|---|---|
| D* | 12 | 5 | — | — | 10 | 1074 | — | — |
| E* | 895 | 589 | — | — | 31 | 1029 | — | — |
| F* | 57 | 46 | — | — | 12 | 824 | 93 | 339 |
| 5 | 30 | 24 | 14 | 951 | 16 | 1116 | 48 | — |
| 6 | 33 | 29 | — | — | 14 | 938 | — | — |
| 7 | 44 | 37 | 15 | 846 | 14 | 854 | 39 | — |
| 8 | 41 | 35 | 13 | 785 | 14 | 810 | 45 | 461 |
| 9 | 43 | 38 | — | — | 12 | 823 | — | — |
| 10 | 23 | 23 | — | — | 14 | 902 | — | — |
| 11 | 30 | 26 | — | — | 16 | 1090 | — | 976 |
| 12 | 20 | 17 | 12 | 961 | 13 | 931 | — | 1247 |
| 13 | 16 | 14 | — | — | 13 | 814 | — | 691 |
| 14 | 212 | 160 | — | — | 29 | 857 | — | — |
| 15 | 18 | 14 | 12 | 1127 | 10 | 1573 | — | 2074 |
| 16 | 23 | 20 | — | — | 12 | 968 | — | — |
| 17 | 20 | 18 | — | — | 13 | 1252 | — | 1274 |
| 18 | 323 | 239 | — | — | 30 | 808 | — | — |
| 19 | 706 | 483 | — | — | 36 | 871 | — | — |
| G* | 15 | 15 | — | — | 17 | 1000 | — | 746 |
| H* | 16 | 15 | — | — | 15 | 829 | — | 569 |
| I* | 210 | 147 | — | — | 29 | 697 | — | — |
| J* | — | — | — | — | 32 | 609 | — | — |
| K* | — | — | — | — | — | — | — | — |

| Ex. | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|
| D* | 91 | 83 | 760 | — | — |
| E* | — | — | — | — | — |
| F* | 78 | 65 | 400 | 42 | — |
| 5 | 87 | 74 | 790 | 14 | 33 |
| 6 | — | 75 | 861 | 13 | — |
| 7 | 82 | 73 | 810 | 20 | — |
| 8 | 82 | 74 | 760 | 22 | — |
| 9 | — | — | — | 25 | — |
| 10 | 86 | 75 | 860 | 12 | — |
| 11 | 89 | 66 | 510 | 14 | 30 |
| 12 | 91 | 75 | 700 | 17 | — |
| 13 | 91 | — | — | 21 | — |
| 14 | — | — | — | — | — |
| 15 | 89 | 83 | 770 | 14 | — |
| 16 | 88 | 83 | 1040 | 13 | — |
| 17 | 13 | 83 | 920 | 4 | — |
| 18 | — | — | — | — | — |
| 19 | — | — | — | — | — |
| G* | 86 | 53 | 110 | 27 | 50 |
| H* | 87 | 60 | 380 | 23 | — |
| I* | — | — | — | — | — |
| J* | 93 | 96 | 1900 | 25 | — |
| K* | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm³, preferably less than about 80 mm³, and especially less than about 50 mm³. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 ml. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F, G and H have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative G. Lower stress relaxation means that the polymer retains its force better in applications such as diapers and other garments where retention of elastic properties over long time periods at body temperatures is desired.

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |

TABLE 6-continued

Polymer Optical Properties

| Ex. | Internal Haze (percent) | Clarity (percent) | 45° Gloss (percent) |
|---|---|---|---|
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multiblock Copolymers

Extraction studies of the polymers of examples 5, 7 and Comparative E are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}C$ NMR

Additional Polymer Examples 19A-J, Continuous Solution Polymerization, Catalyst A1/B2+DEZ For Examples 19A-I Continuous solution polymerizations are carried out in a computer controlled well-mixed reactor. Purified mixed alkanes solvent (Isopar™ E available from Exxon Mobil, Inc.), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

For Example 19J

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer.

Process details and results are contained in Table 8. Selected polymer properties are provided in Tables 9A-C.

In Table 9B, inventive examples 19F and 19G show low immediate set of around 65-70% strain after 500% elongation.

TABLE 8

Polymerization Conditions

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % | DEZ Flow lb/hr |
|---|---|---|---|---|---|---|---|---|---|---|---|
| 19A | 55.29 | 32.03 | 323.03 | 101 | 120 | 600 | 0.25 | 200 | 0.42 | 3.0 | 0.70 |
| 19B | 53.95 | 28.96 | 325.3 | 577 | 120 | 600 | 0.25 | 200 | 0.55 | 3.0 | 0.24 |
| 19C | 55.53 | 30.97 | 324.37 | 550 | 120 | 600 | 0.216 | 200 | 0.609 | 3.0 | 0.69 |
| 19D | 54.83 | 30.58 | 326.33 | 60 | 120 | 600 | 0.22 | 200 | 0.63 | 3.0 | 1.39 |
| 19E | 54.95 | 31.73 | 326.75 | 251 | 120 | 600 | 0.21 | 200 | 0.61 | 3.0 | 1.04 |
| 19F | 50.43 | 34.80 | 330.33 | 124 | 120 | 600 | 0.20 | 200 | 0.60 | 3.0 | 0.74 |
| 19G | 50.25 | 33.08 | 325.61 | 188 | 120 | 600 | 0.19 | 200 | 0.59 | 3.0 | 0.54 |
| 19H | 50.15 | 34.87 | 318.17 | 58 | 120 | 600 | 0.21 | 200 | 0.66 | 3.0 | 0.70 |
| 19I | 55.02 | 34.02 | 323.59 | 53 | 120 | 600 | 0.44 | 200 | 0.74 | 3.0 | 1.72 |
| 19J | 7.46 | 9.04 | 50.6 | 47 | 120 | 150 | 0.22 | 76.7 | 0.36 | 0.5 | 0.19 |

| Ex. | Cocat 1 Conc. ppm | Cocat 1 Flow lb/hr | Cocat 2 Conc. ppm | Cocat 2 Flow lb/hr | $Zn^4$ in polymer ppm | Poly Rate[5] lb/hr | Conv[6] wt % | Polymer wt % | Eff.[7] |
|---|---|---|---|---|---|---|---|---|---|
| 19A | 4500 | 0.65 | 525 | 0.33 | 248 | 83.94 | 88.0 | 17.28 | 297 |
| 19B | 4500 | 0.63 | 525 | 0.11 | 90 | 80.72 | 88.1 | 17.2 | 295 |
| 19C | 4500 | 0.61 | 525 | 0.33 | 246 | 84.13 | 88.9 | 17.16 | 293 |
| 19D | 4500 | 0.66 | 525 | 0.66 | 491 | 82.56 | 88.1 | 17.07 | 280 |
| 19E | 4500 | 0.64 | 525 | 0.49 | 368 | 84.11 | 88.4 | 17.43 | 288 |
| 19F | 4500 | 0.52 | 525 | 0.35 | 257 | 85.31 | 87.5 | 17.09 | 319 |
| 19G | 4500 | 0.51 | 525 | 0.16 | 194 | 83.72 | 87.5 | 17.34 | 333 |
| 19H | 4500 | 0.52 | 525 | 0.70 | 259 | 83.21 | 88.0 | 17.46 | 312 |
| 19I | 4500 | 0.70 | 525 | 1.65 | 600 | 86.63 | 88.0 | 17.6 | 275 |
| 19J | — | — | — | — | — | — | — | — | — |

[1] standard cm³/min
[2] [N-2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dimethyl
[4] ppm in final product calculated by mass balance
[5] polymer production rate
[6] weight percent ethylene conversion in reactor
[7] efficiency, kg polymer/g M where g M = g Hf + g Z

TABLE 9A

Polymer Physical Properties

| Ex. | Density (g/cc) | I2 | I10 | I10/I2 | Mw (g/mol) | Mn (g/mol) | Mw/Mn | Heat of Fusion (J/g) |
|---|---|---|---|---|---|---|---|---|
| 19A | 0.8781 | 0.9 | 6.4 | 6.9 | 123700 | 61000 | 2.0 | 56 |
| 19B | 0.8749 | 0.9 | 7.3 | 7.8 | 133000 | 44300 | 3.0 | 52 |

TABLE 9A-continued

Polymer Physical Properties

| | | | | | | | | |
|---|---|---|---|---|---|---|---|---|
| 19C | 0.8753 | 5.6 | 38.5 | 6.9 | 81700 | 37300 | 2.2 | 46 |
| 19D | 0.8770 | 4.7 | 31.5 | 6.7 | 80700 | 39700 | 2.0 | 52 |
| 19E | 0.8750 | 4.9 | 33.5 | 6.8 | 81800 | 41700 | 2.0 | 49 |
| 19F | 0.8652 | 1.1 | 7.5 | 6.8 | 124900 | 60700 | 2.1 | 27 |
| 19G | 0.8649 | 0.9 | 6.4 | 7.1 | 135000 | 64800 | 2.1 | 26 |
| 19H | 0.8654 | 1.0 | 7.0 | 7.1 | 131600 | 66900 | 2.0 | 26 |
| 19I | 0.8774 | 11.2 | 75.2 | 6.7 | 66400 | 33700 | 2.0 | 49 |
| 19J | 0.8995 | 5.6 | 39.4 | 7.0 | 75500 | 29900 | 2.5 | 101 |

| Ex. | Tm (° C.) | Tc (° C.) | TCRYSTAF (° C.) | Tm − TCRYSTAF (° C.) | CRYSTAF Peak Area (wt %) |
|---|---|---|---|---|---|
| 19A | 119 | 97 | 46 | 73 | 40 |
| 19B | 122 | 100 | 30 | 92 | 76 |
| 19C | 122 | 100 | 30 | 92 | 8 |
| 19D | 119 | 97 | 48 | 72 | 5 |
| 19E | 121 | 97 | 36 | 84 | 12 |
| 19F | 119 | 88 | 30 | 89 | 89 |
| 19G | 120 | 92 | 30 | 90 | 90 |
| 19H | 118 | 88 | — | — | — |
| 19I | 119 | 99 | 40 | 79 | 13 |
| 19J | 122 | 106 | — | — | — |

TABLE 9B

Polymer Physical Properties of Compression Molded Film

| Example | Density (g/cm$^3$) | Melt Index (g/10 min) | Immediate Set after 100% Strain (%) | Immediate Set after 300% Strain (%) | Immediate Set after 500% Strain (%) | Recovery after 100% (%) | Recovery after 300% (%) | Recovery after 500% (%) |
|---|---|---|---|---|---|---|---|---|
| 19A | 0.878 | 0.9 | 15 | 63 | 131 | 85 | 79 | 74 |
| 19B | 0.877 | 0.88 | 14 | 49 | 97 | 86 | 84 | 81 |
| 19F | 0.865 | 1 | — | — | 70 | — | 87 | 86 |
| 19G | 0.865 | 0.9 | — | — | 66 | — | — | 87 |
| 19H | 0.865 | 0.92 | — | 39 | — | — | 87 | — |

TABLE 9C

Average Block Index For exemplary polymers[1]

| Example | Zn/C$_2$[2] | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1] Additional information regarding the calculation of the block indices for various polymers is disclosed in U.S. patent application Ser. No. 11/376,835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.
[2] Zn/C$_2$ * 1000 = (Zn feed flow*Zn concentration/1000000/Mw of Zn)/(Total Ethylene feed flow*(1-fractional ethylene conversion rate)/Mw of Ethylene)*1000. Please note that "Zn" in "Zn/C$_2$*1000" refers to the amount of zinc in diethyl zinc ("DEZ") used in the polymerization process, and "C2" refers to the amount of ethylene used in the polymerization process.

татABLE 10

Properties and Additives of Examples 20-21

| | Example 20 | | Example 21 | |
|---|---|---|---|---|
| Density (g/cc) | 0.8800 | | 0.8800 | |
| MI | 1.3 | | 1.3 | |
| Additives | DI Water | 100 | DI Water | 75 |
| | Irgafos 168 | 1000 | Irgafos 168 | 1000 |
| | Irganox 1076 | 250 | Irganox 1076 | 250 |
| | Irganox 1010 | 200 | Irganox 1010 | 200 |
| | Chimmasorb 2020 | 100 | Chimmasorb 2020 | 80 |
| Hard segment split (wt %) | 35% | | 35% | |

Examples 20 and 21

The ethylene/α-olefin interpolymer of Examples 20 and 21 were made in a substantially similar manner as Examples 19A-1 above with the polymerization conditions shown in Table 11 below. The polymers exhibited the properties shown in Table 10. Table 10 also shows any additives to the polymer.

Irganox 1010 is Tetrakismethylene(3,5-di-t-butyl-4-hydroxyhydrocinnamate)methane. Irganox 1076 is Octadecyl-3-(3',5'-di-t-butyl-4'-hydroxyphenyl)propionate. Irgafos 168 is Tris(2,4-di-t-butylphenyl)phosphite. Chimasorb 2020 is 1,6-Hexanediamine, N,N"-bis(2,2,6,6-tetramethyl-4-piperidinyl)-polymer with 2,3,6-trichloro-1,3,5-triazine, reaction products with, N-butyl-1-butanamine and N-butyl-2,2,6,6-tetramethyl-4-piperidinamine.

TABLE 11

Polymerization Conditions for Examples 20-21

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % |
|---|---|---|---|---|---|---|---|---|---|---|
| 20 | 130.7 | 196.17 | 712.68 | 1767 | 120 | 499.98 | 1.06 | 298.89 | 0.57 | 4.809423 |
| 21 | 132.13 | 199.22 | 708.23 | 1572 | 120 | 462.4 | 1.71 | 298.89 | 0.6 | 4.999847 |

| Ex. | DEZ Flow lb/hr | Cocat 1 Conc. ppm | Cocat 1 Flow lb/hr | Cocat 2 Conc. ppm | Cocat 2 Flow lb/hr | $Zn^4$ in polymer ppm | Poly Rate[5] lb/hr | Conv[6] wt % | Polymer wt % | Eff.[7] |
|---|---|---|---|---|---|---|---|---|---|---|
| 20 | 0.48 | 5634.36 | 1.24 | 402.45 | 0.478 | 131 | 177 | 89.25 | 16.94 | 252.04 |
| 21 | 0.47 | 5706.4 | 1.61 | 289.14 | 1.36 | 129 | 183 | 89.23 | 17.52 | 188.11 |

*Comparative, not an example of the invention
[1] standard cm³/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dibenzyl
[4] ppm Zinc in final product calculated by mass balance
[5] polymer production rate
[6] weight percent ethylene conversion in reactor
[7] efficiency, kg polymer/g M where g M = g Hf + g Z Measurements for Examples 22-33

By the term "MI," is meant melt index, $I_2$, in g/10 min, measured using ASTM D-1238-04, Condition 190° C./2.16 kg for polyethylene-based polymers (Condition 230° C./2.16 kg for polypropylene-based polymers).

Differential Scanning Calorimetry (DSC) can be used to measure crystallinity in polyethylene (PE) based samples and polypropylene (PP) based samples. A sample is pressed into a thin film at a temperature of 190° C. About five to eight mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min until complete melting (second heat). The percent crystallinity is calculated by dividing the heat of fusion (HO, determined from the second heat curve, by a theoretical heat of fusion of 292 J/g for PE (165 μg, for PP), and multiplying this quantity by 100 (for example, % cryst.=($H_f$/292 J/g)×100 (for PE)).

Unless otherwise stated, melting point(s) ($T_m$) of each polymer sample is determined from the second heat curve obtained from DSC, as described above. The crystallization temperature ($T_c$) is measured from the first cooling curve.

Density is measured in accordance with ASTM D-792-00.
Fourier Transform Infrared Spectroscopy (FTIR) Analysis
Maleic Anhydride Content The concentration of maleic anhydride is determined by the ratio of peak heights of the maleic anhydride at wave number 1791 cm$^{-1}$ to the polymer reference peak, which in case of polyethylene, is at wave number 2019 cm$^{-1}$. Maleic anhydride content is calculated by multiplying this ratio with the appropriate calibration constant. The equation used for maleic grafted olefin multiblock interpolymers has the following form.

$$MAH(\text{wt. \%}) = A*\{[FTIR\ \text{PeakArea}@1791\ cm^{-1}]/[FTIR\ \text{PeakArea}\ 2019\ cm^{-1}] + B*[FTIR\ \text{PeakArea}@1712\ cm^{-1}]/[FTIR\_\text{PeakArea}@2019\ cm^{-1}]\}$$ (Eqn. 1)

The calibration constant A can be determined using C13 NMR standards. The actual calibration constant may differ slightly depending on the instrument and polymer. The second component at wave number 1712 cm$^{-1}$ accounts for the presence of maleic acid, which is negligible for freshly grafted material. Over time however, maleic anhydride is readily converted to maleic acid in the presence of moisture. Depending on surface area, significant hydrolysis can occur in just a few days under ambient conditions. The acid has a distinct peak at wave number 1712 cm$^{-1}$ The constant B in Equation 1 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for 1 hour. Mylar and Teflon are suitable protective films to protect the sample from the platens. Aluminum foil must never be used (maleic anhydride reacts with aluminum). Platens should be under pressure (~10 ton) for about 5 minutes. The sample is allowed to cool to room temperature, placed in an appropriate sample holder, and then scanned in the FTIR. A background scan should be run before each sample scan or as needed. The precision of the test is good with an inherent variability of less than ±5%. Samples should be stored with desiccant to prevent excessive hydrolysis. Moisture content in the product has been measured as high as 0.1 weight percent. The conversion of anhydride to acid however is reversible with temperature but may take up to one week for complete version. The reversion is best performed in a vacuum oven at 150° C. a good vacuum (near 30 inches Hg) is required. If the vacuum is less than adequate the sample tends to oxidize resulting in an infrared peak at approximately 1740 cm$^{-1}$ which will cause the values to below. Maleic anhydride and acid are represented by peaks at about 1791 and 1712 cm$^1$, respectively.

Examples 22-33

The following examples illustrate, but do not, either explicitly or by implication, limit the present invention.

The following polymers were used in the examples below. EN82 (Engage™ 8200) is a random ethylene/octene-1 copolymer, with a density of 0.870 and a melt index (I2) of 5.

EN84 (Engage™ 8400) is a random ethylene/octene-1 copolymer, with a density of 0.870 and a melt index (I2) of 30.

EN81 (Engage™ 8100) is a random ethylene/octene-1 copolymer, with a density of 0.870 and a melt index (I2) of 1.

EN83 (Engage™ 8130) is a random ethylene/octene-1 copolymer, with a density of 0.864 and a melt index (I2) of 13.

AM21 (Amplify™ GR-216) is a random ethylene/octene-1 copolymer grafted with ca. (about) 0.8 wt % maleic anhydride, with a density of 0.875 and a melt index (I2) of 1.3.

PU80 (Pellethane™ 12102-80A) is a thermoplastic polyurethane, with a density of 1.18 and a melt index (I2) of 4 measured at 190° C. and 8.7 Kg.

Example 22

A poly(ethylene-co-octene) copolymer grafted with 0.80 wt % maleic anhydride (45 grams, AMPLIFY™ GR-216) was added to the bowl of a Haake mixer, set at 160° C., and the polymer was allowed to melt and flux for two minutes. To the molten polymer was added 1.61 g (18.2 mmol; 5 equiv.) of N-ethyl-ethylenediamine in dropwise fashion. After the diamine addition, the polymer melt was allowed to mix for an additional five minutes, before being removed from the Haake mixer, and allowed to cool. Infrared analysis of the resulting product indicated essentially complete conversion of the grafted anhydride functionality (1790 cm$^{-1}$) to imide functionality (1710 cm$^{-1}$).

Comparative Example 22A

The procedure in Example 1 was repeated, only 1.35 g of N-methyl-ethylenediamine was used in place of N-ethyl-ethylenediamine. The melt reaction product crosslinked upon addition of this diamine, affording an insoluble gel.

Comparative Example 22B

The procedure in Example 1 was repeated, only 2.35 g (18.2 mmol) of N-(2-aminoethyl)-piperazine was used in place of N-ethyl-ethylenediamine. The melt reaction product crosslinked upon addition of this diamine, affording an insoluble gel.

Example 23

The procedure detailed in Example 22 was repeated, only 1.11 g (18.2 mmol) of ethanolamine was substituted for the diamine. The resulting product likewise showed complete conversion from anhydride functionality to N-(2-hydroxyethyl)maleimide by infrared analysis.

Example 24

Preparation of Maleamic Acid

Maleic anhydride (7.84 g (80 mmol) was dissolved in 20 mL of acetone. To the maleic anhydride solution was added another solution of ethanolamine (4.88 g, 80 mmol) dissolved in 10 ml, of acetone. The reaction solution was kept cool using an ice bath, and after all the ethanolamine solution was added, the solution was stripped on a rotary evaporator to afford a light yellow oil, which crystallized upon standing. Proton NMR analysis of the crystalline material was consistent with that of the desired maleamic acid product, as shown below in structure (II):

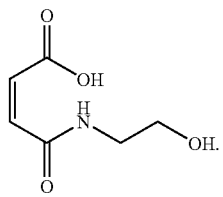

(II)

Example 25

Poly(ethylene-co-octene) copolymer (45 g. ENGAGE™ 8400) was added to a Haake mixer set at a temperature of 170° C., and allowed to melt and flux for two minutes. To the molten polymer was added 1.0 g of maleic anhydride, and the mixture was fluxed for another two minutes, and then 0.10 wt % of Luperox™ 101 peroxide (90% active) was added. After an additional five minutes of reaction time, 1.21 g (19.8 mmol) of ethanolamine was added and the reaction allowed to continue for five more minutes. The mixer was stopped, and the functionalized polymer was removed and allowed to cool. A portion of the reaction product was dissolved in hot toluene and precipitated into cold methanol to remove unreacted reagents and byproducts. Infrared analysis of the precipitated polymer indicated that the ethylene-octene copolymer was indeed functionalized with N-(2-hydroxy)-maleimide. The product appeared identical to that prepared in Examples 2 and 3 based on its infrared spectrum.

Example 26

The same procedure as described in Example 25 was repeated, only 1.63 g (18.5 mmol) of N-ethyl-ethylenediamine was used in place of ethanolamine. Again, infrared analysis of the resulting polymer after precipitation was consistent with functionalization of the ethylene-octene elastomer with N—(N-ethylaminoethyl)-maleimide. The product appeared identical to that prepared in Example 1 based on its infrared spectrum.

Example 27

Adhesion Comparison

Samples of the polymers prepared in Examples 22 and 23 were compression molded into ⅛ inch thick plaques, along with the maleic anhydride starting polymer (AMPLIFY™ GR-216), an unfunctionalized control (ENGAGE™ 8100), and a thermoplastic polyurethane (TPU; PELLETHANE™ 2102-80A). Bars, "½ inch" in width, were cut from the plaques, and were compression molded to bars of the TPU at 180° C. for two minutes. The level of adhesion between the TPU and the various polyolefins was accessed as "cohesive failure" or "adhesive failure" based on the following criteria when pulling them apart:

Cohesive failure: one or both of the polymers deforms and/or breaks before the interface between them fails.

Adhesive failure: the interface between the polymers fails first.

The samples involving TPU molded to unfunctionalized polyolefin (ENGAGE™ 8100), maleic anhydride grafted polyolefin (AMPLIFY™ GR-216), and hydroxy-functionalized polyolefin (Example 23) all failed adhesively. The sample involving TPU molded to amino-functionalized polyolefin failed cohesively.

Summary of Results—Direct Addition Process

Table 12 summarizes the results of various experiments to react 0.80 wt % maleic anhydride grafted ethylene-octene elastomer with a number of primary-secondary diamines. The diamines were added to the polymer melt. A crosslinked polymer formed when N-(methyl)ethylenediamine or N-(2-aminoethyl)piperazine was used as the diamine.

TABLE 12

| diamine | imidization product * |
|---|---|
| HN-piperazine-CH₂CH₂-NH₂ | x-linked |
| CH₃-NH-CH₂CH₂-NH₂ | x-linked |
| CH₃-NH-CH₂CH₂CH₂-NH₂ | x-linked |
| Et-NH-CH₂CH₂-NH₂ | soluble |
| Et-NH-CH₂CH₂CH₂CH₂-NH₂ | soluble |

Example 28

Preparation of Hydroxy-Functions/Elastomer by Successive Maleation and Imidization A sample of ethylene-octene elastomer (45 g, ENGAGE 8130) was mixed in a Haake melt blender for two minutes at 170° C. and 100 rpm. To this was added maleic anhydride (1.0 g. 10.2 mmol), and the resulting mixture was blended for an additional two minutes, before the addition of 0.0504 grams of active Luperox™ 101 peroxide (0.7 mmol ROW). After an additional five minutes of mixing time at 170° C., to allow grafting of the maleic anhydride to the elastomer, 1.2 grams of ethanolamine (19.7 mmol) was added, and the resulting mixture was allowed to react for an additional two minutes at 170° C., to convert maleic anhydride to hydroxy functionality. The product was removed from the Haake blender and allowed to cool.

A sample of the product was dissolved in hot toluene, and precipitated by addition to an excess of cold methanol, in order to remove unreacted maleic anhydride, ethanolamine, and any residual peroxide and/or its decomposition products. The precipitated sample was redissolved in hot toluene, and reprecipitated into excess methanol, a second time, to further purify the sample for analysis. A portion of the twice precipitated sample was dissolved in warm deuterated 1,1,2,2-tetrachloroethane (~30 mg polymer/2 mL solvent), and analyzed by proton NMR (300 MHz; 80° C.). The characteristic chemical shifts for the four hydrogens of the 2-hydroxyethylimide group were observed at 3.7-3.8 ppm, and the relative area of the peak was 0.81% compared to the total area (hydroxyethylimide ethylene-octene signal areas).

Example 29

Preparation of Hydroxy-Functional Elastomer by Direct Grafting of Maleamic Acid

A sample of ethylene-octene elastomer (45 g, ENGAGE 8130) was mixed in a Haake melt blender for two minutes at 170° C. and 100 rpm. To this was added 1.5 gram of maleamic acid (9.4 mmol; prepared per EXAMPLE 24), and the resulting mixture was blended for an additional two minutes, before the addition of 0.0504 grams of active Luperox™ 101 peroxide (0.7 mmol RO•). After an additional five minutes of mixing time at 170° C., to allow grafting of the maleamic acid to the elastomer, the product was removed from the Haake blender and allowed to cool. A sample of the product was dissolved in hot toluene and precipitated into an excess of cold methanol in order to remove unreacted maleamic acid and residual peroxide and/or its decomposition products.

The precipitated sample was redissolved in hot toluene and reprecipitated into methanol, a second time, to further purify the sample for analysis. A portion of the twice precipitated sample was dissolved in warm, deuterated 1,1,2,2-tetrachloroethane (~30 mg polymer/2 mL solvent), and analyzed by proton NMR (300 MHz; 80° C.). The characteristic chemical shifts for the four hydrogens of the 2-hydroxyethylimide group were observed at 3.7-3.8 ppm, and relative area of the peak was 1.73% compared to the total area (hydroxyethylimide+ethylene-octene signal areas). These data suggest that more hydroxyethylmaleimide functionality was grafted onto the elastomer backbone by the procedure in Example 29 versus that described in Example 28.

Example 30

Preparation of Amine-Functionalized Ethylene-Octene Elastomer Diamine Imbibe Process Poly(ethylene-co-octene) copolymer (45 grams) grafted with 0.74 wt % maleic anhydride (3.4 mmol anhydride) was placed in a sealed container with 0.60 grams of N-ethylethylenediamine (6.8 mmol) and allowed to stand for 4 hours, allowing the diamine to completely imbibe into the pellets of the MAH grafted copolymer. The pellets were then added to the bowl of a Haake mixer set at 180° C., and the polymer was allowed to melt and mix at that temperature for five minutes. The product was then removed from the Haake mixer, and allowed to cool to room temperature. Infrared analysis of the resulting product indicated essentially complete conversion of the grafted anhydride functionality (1790 cm$^{-1}$) to imide functionality (1710 cm$^{-1}$) in accordance with the following chemical equation:

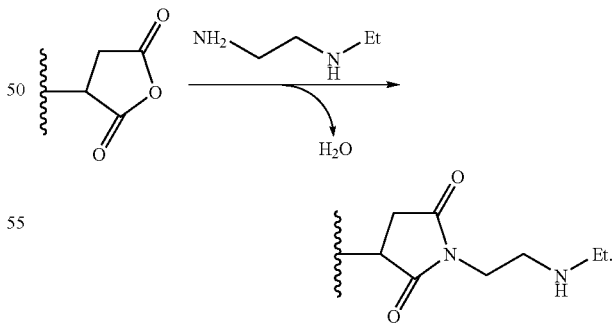

In addition, a small compression molded film of the (ethylene-co-octene) copolymer, grafted with maleic anhydride, was characterized by FTIR, and then the film was placed in a small vial at room temperature, along with a molar excess of N-(ethyl)ethylene diamine compared to the maleic anhydride grafted to the ethylene-octene copolymer. After a period of several hours, the now-imbibed film was again characterized by FTIR, and the spectrum indicated essentially complete conversion of the original maleic anhydride groups (1790 cm$^{-1}$) to maleamic acid groups (1640 cm$^{-1}$) consistent with the following chemical equation:

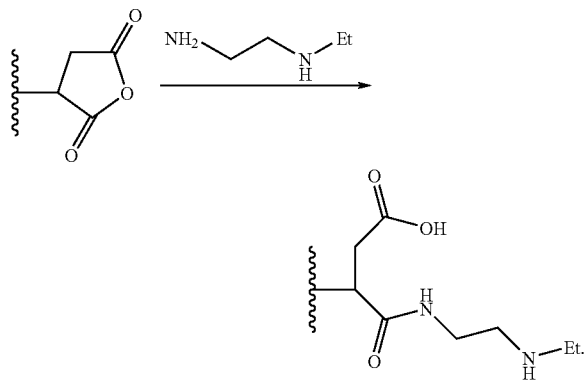

These data suggest that partial reaction occurs between maleic anhydride and the diamine at room temperature, before the material is subjected to elevated temperature melt mixing. This process is advantaged in that no separate diamine feed system or process control needs to be added to the melt mixing equipment used to prepare these functionalized polymers.

Example 31

The procedure in Example 30 was repeated, only 0.50 g of N-methyl-ethylenediamine was used in place of N-ethyl-ethylenediamine. The reaction product was completely soluble and not crosslinked. This is in contrast to the direct addition method of Comparative Example 22A, which yielded a crosslinked product.

Example 32

The procedure in Example 30 was repeated, only 0.88 g of N-(2-aminoethyl)-piperazine was used in place of N-ethyl-ethylenediamine. The reaction product was completely soluble and not crosslinked. This is in contrast to the direct addition method of Comparative Example 22B, which yielded a crosslinked product.

Summary (if Results—Imbibe Process

Table 13 summarizes the results of the imbibing examples. As shown in Table 13, all of the diamines produced soluble polymer product. Primary-primary diamines typically produced crosslinked polymer.

TABLE 13

| diamine | imidization |
|---|---|
| HN-piperazine-CH2CH2-NH2 | soluble |
| CH3-NH-CH2CH2-NH2 | soluble |
| CH3-NH-CH2CH2CH2-NH2 | soluble |

TABLE 13-continued

| diamine | imidization |
|---|---|
| Et-NH-CH2CH2-NH2 | soluble |
| Et-NH-CH2CH2CH2CH2-NH2 | soluble |

Morphology Study 1

Figure 8:
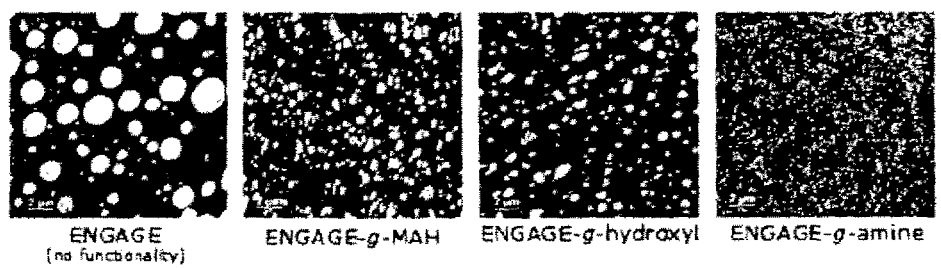
FIG. 8 depicts electron micrographs showing particle sizes and shapes of several polyethylene/polyurethane blends.

Samples of amine- and hydroxyl-functionalized ethylene-octene elastomer prepared according to Examples 22 and 23, respectively, were blended with a thermoplastic polyurethane polymer (TPU; PELLETHANE™ 2102-80A). The following controls were each blended with the TPU: unfunctionalized ethylene-octene elastomer (ENGAGE™ 8100) and maleic anhydride-functionalized ethylene-octene elastomer (AMPLIFY GR-216). The mass ratio of TPU to ethylene-octene polymer in the blends was 80/20, and the blends were prepared by mixing both polymeric components at 180° C., for five minutes, in a Haake blender. The resulting blend morphologies were examined using transmission electron microscopy, and are shown in FIG. 8.

The data clearly show that the functionality in the ethylene-octene phase improved the dispersion of the ethylene-octene polymer in the TPU phase, as compared to the unfunctionalized controls (ENGAGE™ 8100). In particular, it is advantageous to employ amine functionality to achieve the best dispersion of ethylene-octene copolymer in TPU.

The mean particles sizes, as determined from the micrographs, were as follows:
1) 80/20 TPU/ENGAGE mean size=0.84±0.79 μm (bimodal),
2) 80/20 TPU/ENGAGE-g-MAH mean size=0.35±0.28 μm,
3) 80/20 TPU/ENGAGE-g-hydroxyl mean size=0.42±0.32 μm, and
4) 80/20 TPU/ENGAGE-g-amine mean size=0.11±0.10 μm.

The smaller particle sizes may be due to better interfacial associations and/or compatibility between the functionalized olefin multiblock interpolymers and the polyurethane. The amine functionalization and the hydroxyl functionalization can each react with urethane groups along the backbone of the polyurethane.

Morphology Study II

An amine-functionalized ethylene-octene elastomer, prepared according to the procedure described in Example 25, was blended with unfunctionalized ethylene-octene elastomer at various ratios. The unfunctionalized elastomer was ENGAGE™ 8100 with a density of 0.87 glee and a melt index of 1.0 g/10 min (190° C. 2.16 Kg). The blending was carried out in a Haake melt mixer at a temperature of about 180° C. for five minutes. The blends had the following compositions on a relative weight basis.

Blend 1: 50 wt % amino-functionalized elastomer+50 wt % ENGAGE™ 8100
Blend 2: 25 wt % amino-functionalized elastomer+75 wt % ENGAGE™ 8100
Blend 3: 12 wt % amino-functionalized elastomer+88 wt % ENGAGE™ 8100

Subsequently, these blends were then compounded with a thermoplastic polyurethane (TPU), namely PELLETHANE™ 2102-80A with a density of 1.18 glee and a melt index of 4.0 g/10 min (190° C./8.7 kg). The relative weight ratio of the amino-functionalized elastomer, or its blend with unfunctionalized elastomer, to that of the TPU was 20/80. In addition, two control samples were prepared in a similar manner. Control A was a blend of 80 wt % TPU with 20 wt % ENGAGE™ 8100 (0% amino-functionalized resin) and Control B was a blend of 80 wt % TPU with the amino-functionalized elastomer itself (100% amino-functionalized resin).

Figure 9:
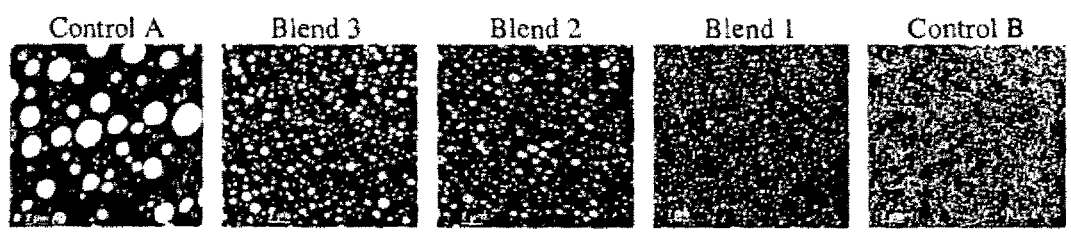
FIG. 9 depicts electron micrographs showing particle sizes and shapes of several amine-functionalized polyethylene/polyurethane blends and two controls.

The compounding was carried out in a Haake mixer at temperature of about 180° C. for five minutes. Upon cooling, a small portion of the TPU/polyolefin elastomer blend was compression molded into a small plaque, and then the morphology of the blend was assessed using standard transmission electron microscopy techniques. The results are illustrated in FIG. 9.

These results indicate that the functionalized ethylene-octene elastomer can be diluted with unfunctionalized resin, and still give rise to a significant improvement in compatibility when blended with a polar polymer, such as TPU. In FIG. 9, the weight percent amino-functionalized elastomer in polyolefin (dispersed) phase is as follows: Control A—0 wt %, Blend 3—12 wt %. Blend 2—25 wt %. Blend 1—50 wt %, Control B—100 wt %.

Adhesion to Polycarbonate

Polycarbonate Substrate

Dow's Calibre™ 200-22 polycarbonate pellets were injection-molded against a textured plaque to obtain polycarbonate plaques with identical textured surfaces, and designated as CPM501. This textured feature is common in the over molding industry because it provide some interlocking of the different layers.

Functionalized Engage™ material

Three imidized Engage™ material compounds, a maleic anhydride (MAH) Engage™, a primary-hydroxy functionalized Engage™, and secondary amine functionalized Engage™ were used in this study. A schematic of each functional group is shown below.

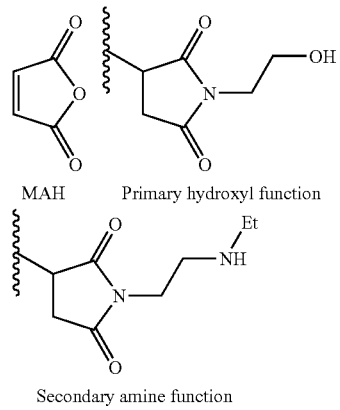

MAH    Primary hydroxyl function

Secondary amine function

Fabrication of the Peel Test Specimen

The functionalized Engage™ materials were first pressed into thin films, less than "1/32 inch" width, using a threefold cycle of compression at 284° F., using consecutive pressures of 1,000 psi, then 40,000 psi, and then 40,000 psi, respectively, for the following dwell times: three minutes, three minutes and seven minutes, respectively.

Each film of functionalized Engage™ material was welded against a "1/8 inch" piece of regular Engage™ material using a protocol identical to the one described in the previous paragraph. A threefold cycle of compression at 284° F., using consecutive pressures of 1,000 psi, then 40,000 psi, and then 40,000 psi, respectively, for the following dwell times: three minutes, three minutes and seven minutes, respectively.

The assemble functionalized Engage™/Engage™ was then pressed against the textured polycarbonate plaque. Mylar was inserted at the edge of the plaque to create a zone with no adhesion between the functionalized Engage™ material and the polycarbonate surface. The functionalized Engage™ face was pressed against the textured polycarbonate using a threefold cycle of compression at 284° F. with consecutive pressures of 1.000 psi, then 40,000 psi, and then 40,000 psi, respectively, for nine seconds, one minute and seven minutes dwell times, respectively. The thickness of the Engage™ material was between 1.5 and 1.6 millimeter.

Figure 10:
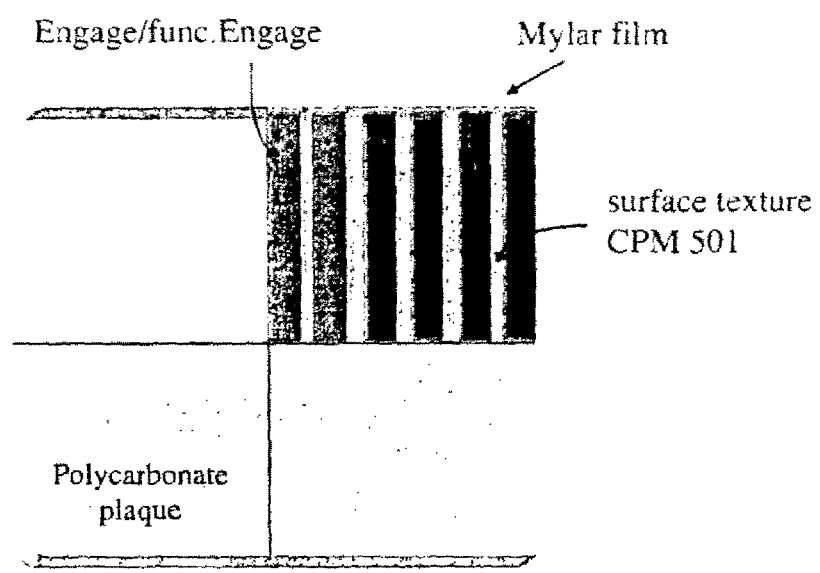
FIG. 10 is a schematic a peel test specimen.

Specimens were cooled to ambient temperature. The final step of the preparation was to stamp the Engage™/functionalized Engage™ with a one slit die to create 6 to 8 long stripes, parallel to one edge of the plaque, of about 5.2 mm width and 50 mm long. A schematic of this peel test specimen is shown in FIG. 10.

Peel Test Measurements

Figure 11:
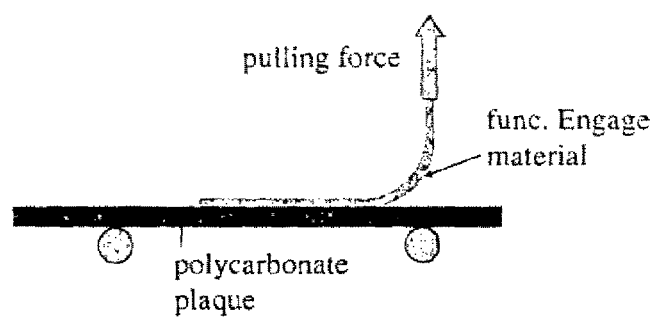
FIG. 11 is a schematic of a peel test set-up.

The free end of the functionalized (Engage™)/Engage™) stripe was pulled using an air grip device on a 4201 Instron tensile tester machine at 23° C. and 50% RH (relative humidity). The polycarbonate plaque was tightly attached to an Instron peel test device, moving at the same speed as the cross-head, but in a perpendicular direction, in such a way that the pull force was always applied perpendicularly to the plaque. This specific setup is called a 90 degree peel test, referenced in ASTM D6862-04, entitled "Standard Test Method for 90 Degree Peel Resistance of Adhesives." A schematic of the test set-up is shown in FIG. 11.

The speed of the displacement was constant at 0.3 millimeter per second. Force and displacement were recorded automatically through Bluehill™ software from Instron. The load, reported in kilogram or Newton (1 kg=9.81 Newton), was then divided by the width of the stripe to obtain the peel strength in Newton per millimeter. The median value and the standard deviation of the peel strength over a range of 10 to 30 millimeters are reported in Table 14 below.

TABLE 14

Peel Strength versus Functionalized Engage

| Functionalization | Maleic anhydride | Primary hydroxyl | Secondary amine |
|---|---|---|---|
| MEDIAN | 0.256 | 0.543 | 1.034 |
| STDEV | 0.028 | 0.029 | 0.062 |

Figure 12:
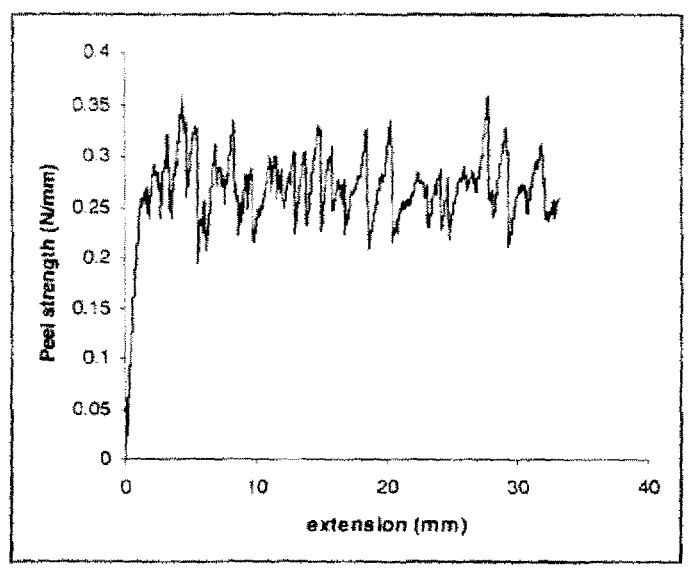
FIG. 12 represents a peel strength profile of a MAH-Engage™/Polycarbonate
Figure 13:
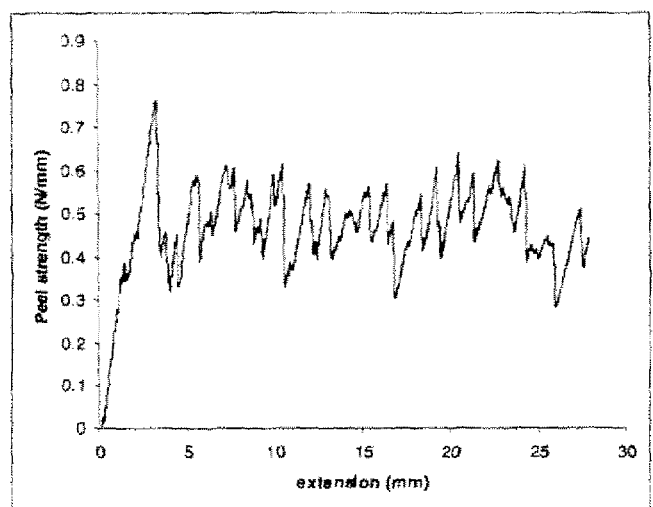
FIG. 13 represents a peel strength of profile of a primary hydroxyl functionalized. Engage™/Polycarbonate.
Figure 14:
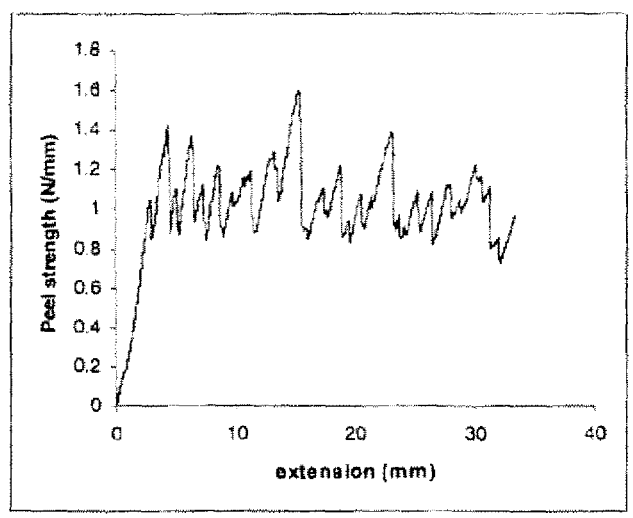
FIG. 14 represents a peel strength profile of secondary amine-functionalized Engage®/Polycarbonate.

Representative peel strength profiles for the three imidized Engage™ material compounds, the maleic anhydride (MAH) Engage™, the primary-hydroxy functionalized Engage™, and the secondary amine functionalized Engage™, are shown in FIGS. 12-14, respectively.

Example 33

The procedures in Examples 22-32 may be repeated except that the random ethylene/octene-1-copolymer may be substituted with an ethylene/α-olefin interpolymer characterized by one or more of the following characteristics:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2, \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° C. \text{ for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the ethylene/α-olefin interpolymer; or (e) is characterized by a storage modulus at 25° C. G' (25° C.), and a storage modulus at 100° C., G' (100° C.), wherein the ratio of G' (25° C.) to G' (100° C.) is from about 1:1 to about 10:1; or (f) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3 or (g) an average block index greater than zero and up to about 1.0 and a molecular weight distribution, Mw/Mn, greater than about 1.3. Such ethylene/α-olefin interpolymers may be described in, for example, Examples 1-21 above.

Example 34

This is an example of using a one-step grafting process to introduce hydroxy functionality to an olefin block copolymer backbone. 45.2 grams of OBC 9500 olefin block copolymer (an ethylene/octene-1 multiblock copolymer, with a density of 0.877 g/cc and a melt index (I2) of 5 g/10 min and a product of The Dow Chemical Company) was introduced into the mixing bowl of a Haake batch melt mixer set at a temperature of 180° C. and a mixing rotor speed of 100 rpm. After melting and fluxing the OBC for 2 minutes, 1.0 grams of N-(2-hydroxyethyl)-maleamic acid was added and allowed to mix with the polyolefin for ca. 15 seconds before 0.051 grams of Luperox™ 101 peroxide was also added. The subsequent mixture was allowed to react for 5 minutes at ca. 180° C. before the mixer was stopped and the reaction product removed and allowed to cool to room temperature. A 2 gram portion of the product was dissolved in hot toluene and then precipitated by pouring the toluene solution into an excess of cold methanol. The product was filtered and dried in vacuo overnight at 60° C. Subsequently, the precipitated product was analyzed by both fourier transform infrared spectroscopy (FTIR) and nuclear magnetic resonance spectroscopy (NMR). The FTIR spectrum of the purified product showed a new absorbance at 1700-1705 cm$^{-1}$ characteristic of imide carbonyl groups, as well as an absorbance at 3450 cm$^{-1}$ associated with the hydroxyl group. Analysis of the purified product by NMR showed a new peak at ~3.8 ppm, characteristic of the four protons of the 2-hydroxyethyl moiety.

Comparative Example

This is an example of using a two-step grafting process to introduce hydroxy functionality to an olefin block copolymer backbone. 45.0 grams of OBC 9500-graft-maleic anhydride (1.2 wt % anhydride) olefin block copolymer (OBC) was introduced into the mixing bowl of a Haake batch melt mixer set at a temperature of 180° C. and a mixing rotor speed of 100 rpm. After melting and fluxing the OBC-g-MAH for 2 minutes, 1.1 grams of monoethanolamine was added and allowed to mix with the polyolefin for 5 minutes at ca. 180° C. before the mixer was stopped and the reaction product removed and allowed to cool to room temperature. A 2 gram portion of the product was dissolved in hot toluene and then precipitated by pouring the toluene solution into an excess of cold methanol. The product was filtered and dried in vacuo overnight at 60° C. Subsequently, the precipitated product was analyzed by both fourier transform infrared spectroscopy (FTIR) and nuclear magnetic resonance spectroscopy (NMR). The FTIR spectrum of the purified product showed an absorbance shift from 1790 cm$^{-1}$ to 1700-1705 cm$^{-1}$ characteristic of conversion of the anhydride groups to imide groups, as well as an absorbance at 3450 cm$^{-1}$ associated with the hydroxyl group. Analysis of the purified product by NMR likewise showed a new peak at ~3.8 ppm, characteristic of the four protons of the 2-hydroxyethyl moiety.

Example 35

This is an example of using a one-step grafting process to introduce hydroxy functionality to an olefin block copolymer backbone. 45.0 grams of OBC 9807.10 olefin block copolymer (an ethylene/octene-1 multiblock copolymer, with a density of 0.877 g/cc and a melt index (I2) of 15 g/10 min and a product of The Dow Chemical Company) was introduced into the mixing bowl of a Haake batch melt mixer set at a temperature of 180° C. and a mixing rotor speed of 100 rpm. After melting and fluxing the OBC for 2 minutes, 1.0 grams of N-(2-hydroxyethyl)-maleamic acid was added and allowed to mix with the polyolefin for ca. 15 seconds before 0.051 grams of Luperox™ 101 peroxide was also added. The subsequent mixture was allowed to react for 5 minutes at ca. 180° C. before the mixer was stopped and the reaction product removed and allowed to cool to room temperature. A 2 gram portion of the product was dissolved in hot toluene and then precipitated by pouring the toluene solution into an excess of cold methanol. The product was filtered and dried in vacuo overnight at 60° C. Subsequently, the precipitated product was analyzed by both fourier transform infrared spectroscopy (FTIR) and nuclear magnetic resonance spectroscopy (NMR). The FTIR spectrum of the purified product showed a new absorbance at 1700-1705 cm$^{-1}$ characteristic of imide carbonyl groups, as well as an absorbance at 3450 cm$^{-1}$ associated with the hydroxyl group. Analysis of the purified product by NMR showed a new, strong peak at ~3.8 ppm, characteristic of the four protons of the 2-hydroxyethyl moiety.

Comparative Example

This is an example of using the two-step grafting process to introduce hydroxy functionality to an olefin block copolymer backbone. 45.0 grams of OBC 9807.01-graft-maleic anhydride (1.1 wt % anhydride) olefin block copolymer (OBC) was introduced into the mixing bowl of a Haake batch melt mixer set at a temperature of 180° C. and a mixing rotor speed of 100 rpm. After melting and fluxing the OBC-g-MAH for 2 minutes, 1.2 grams of monoethanolamine was added and allowed to mix with the polyolefin for 5 minutes at ca. 180° C. before the mixer was stopped and the reaction product removed and allowed to cool to room temperature. A 2 gram portion of the product was dissolved in hot toluene and then precipitated by pouring the toluene solution into an excess of cold methanol. The product was filtered and dried in vacuo overnight at 60° C. Subsequently, the precipitated product was analyzed by both Fourier transform infrared spectroscopy (FTIR) and nuclear magnetic resonance spectroscopy (NMR). The FTIR spectrum of the purified product showed an absorbance shift from 1790 cm$^{-1}$ to 1700-1705 cm$^{-1}$ characteristic of conversion of the anhydride groups to imide groups, as well as an absorbance at 3450 cm$^{-1}$ associated with the hydroxyl group. Analysis of the purified product by NMR likewise showed a new, strong peak at ~3.8 ppm, characteristic of the protons of the four protons of the 2-hydroxyethyl moiety.

We claim:

1. A process for preparing an imide functionalized olefin multiblock interpolymer, said process comprising:
   A) grafting onto the backbone of an olefin multiblock interpolymer, in a melt reaction, at least one compound of the following formula (IV) to form a grafted olefin multiblock interpolymer:

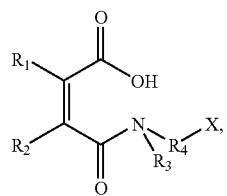

(IV)

B) and thermally treating the grafted olefin multiblock interpolymer to form the imide functionalized olefin multiblock interpolymer, and wherein R1 and R2 are, independently, either hydrogen or a C1-C20 hydrocarbyl radical, which is linear or branched; R3 is hydrogen or a C1-C20 hydrocarbyl radical, which is linear or branched; R4 is a divalent hydrocarbyl radical, which is linear or branched; X is OH or NHR$_5$, where R5 is a hydrocarbyl radical, which linear or branched, or a hydroxyethyl group.

2. The process of claim 1, wherein said olefin multiblock interpolymer comprises an ethylene/α-olefin multiblock interpolymer characterized by one or more of the following characteristics prior to functionalization:
   (a) has a Mw/Mn from about 1.7 to about 3.5, at least one melting point, Tm, in degrees Celsius, and a density, d, in grams/cubic centimeter, wherein the numerical values of Tm and d correspond to the relationship:

$T_m > -2002.9 + 4538.5(d) - 2422.2(d)^2$; or (b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or
   (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the ethylene/α-olefin interpolymer; or
   (e) is characterized by a storage modulus at 25° C., G' (25° C.), and a storage modulus at 100° C., G' (100° C.), wherein the ratio of G' (25° C.) to G' (100° C.) is from about 1:1 to about 10:1; or
   (f) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3; or
   (g) an average block index greater than zero and up to about 1.0 and a molecular weight distribution, Mw/Mn, greater than about 1.3.

3. The process of claim 1, wherein R1 and R2 are, independently, either hydrogen or a C1-C10 hydrocarbyl radical.

4. The process of claim 1, wherein R3 is either hydrogen or a C1-C10 hydrocarbyl radical, and wherein R4 is a divalent C1-C20 hydrocarbyl radical.

5. A process for preparing a imide functionalized olefin multiblock interpolymer, said process comprising:
   A) functionalizing an olefin multiblock interpolymre with at least one compound comprising at least one "amine-reactive" group to form a grafted olefin multiblock interpolymer;
   B) blending the grafted olefin multiblock interpolymer, in a solid, non-molten form, with at least one primary-secondary diamine;
   C) imbibing the primary-secondary diamine into the grafted olefin multiblock interpolymer; and
   D) reacting the primary-secondary diamine with the grafted olefin multiblock interpolymer to form an imide functionalized olefin multiblock interpolymer, and wherein the imided functionalized olefin multiblock interpolymer is formed from an olefin multiblock interpolymer, and wherein the olefin multiblock interpolymer comprises blocks of two or more polymerized monomer units differing in chemical or physical properties, and the blocks are randomly distributed along the polymer chain.

6. The process of claim 5, wherein said olefin multiblock interpolymer comprises an ethylene/α-olefin multiblock interpolymer characterized by one or more of the following characteristics prior to functionalization:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$T_m > -2002.9 + 4538.5(d) - 2422.2(d)^2$; or (b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the ethylene/α-olefin interpolymer; or (e) is characterized by a storage modulus at 25° C., G' (25° C.), and a storage modulus at 100° C., G' (100° C.), wherein the ratio of G' (25° C.) to G' (100° C.) is from about 1:1 to about 10:1; or (f) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3 or (g) an average block index greater than zero and up to about 1.0 and a molecular weight distribution, Mw/Mn, greater than about 1.3.

7. The process of claim 5, wherein the imbibing step takes place at about room temperature.

8. The process of claim 6, wherein the imbibing step takes place at about room temperature.

9. The process of claims 5, wherein the blending step takes place at about room temperature.

10. The process of claims 6, wherein the blending step takes place at about room temperature.

11. The product of the process of claim 1, and wherein the imided functionalized olefin multiblock interpolymer is formed from an olefin multiblock interpolymer, and wherein the olefin multiblock interpolymer comprises blocks of two or more polymerized monomer units differing in chemical or physical properties, and the blocks are randomly distributed along the polymer chain.

12. The product of claim 11, wherein the olefin multiblock interpolymer comprises an ethylene olefin multiblock characterized by one or more of the following characteristics:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$T_m > -2002.9 + 4538.5(d) - 2422.2(d)^2$; or (b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the ethylene/α-olefin interpolymer; or (e) is characterized by a storage modulus at 25° C., G' (25° C.), and a storage modulus at 100° C., G' (100° C.), wherein the ratio of G' (25° C.) to G' (100° C.) is from about 1:1 to about 10:1; or (f) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (g) an average block index greater than zero and up to about 1.0 and a molecular weight distribution, Mw/Mn, greater than about 1.3.

13. The product of claim 1, wherein the olefin multiblock interpolymer comprises an ethylene olefin multiblock characterized by one or more of the following characteristics:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2; \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the ethylene/α-olefin interpolymer; or (e) is characterized by a storage modulus at 25° C., G' (25° C.), and a storage modulus at 100° C., G' (100° C.), wherein the ratio of G' (25° C.) to G' (100° C.) is from about 1:1 to about 10:1; or (f) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (g) an average block index greater than zero and up to about 1.0 and a molecular weight distribution, Mw/Mn, greater than about 1.3.

\* \* \* \* \*